US 6,697,736 B2

(12) United States Patent
Lin

(10) Patent No.: US 6,697,736 B2
(45) Date of Patent: Feb. 24, 2004

(54) POSITIONING AND NAVIGATION METHOD AND SYSTEM THEREOF

(75) Inventor: Ching-Fang Lin, Simi Valley, CA (US)

(73) Assignee: American GNC Corporation, Similvalley, CA (US)

( * ) Notice: Subject to any disclaimer, the term of this patent is extended or adjusted under 35 U.S.C. 154(b) by 43 days.

(21) Appl. No.: 10/072,834

(22) Filed: Feb. 6, 2002

(65) Prior Publication Data

US 2003/0149528 A1 Aug. 7, 2003

(51) Int. Cl.⁷ .............................................. G01C 21/00
(52) U.S. Cl. .................... 701/214; 701/221; 342/357.14
(58) Field of Search ................. 701/213, 214, 701/216, 220, 221; 342/357.06, 357.11, 357.14

(56) References Cited

U.S. PATENT DOCUMENTS

| | | | | |
|---|---|---|---|---|
| 5,379,223 A | * | 1/1995 | Asplund ........................ 701/4 |
| 6,088,653 A | * | 7/2000 | Sheikh et al. ............... 701/214 |
| 6,167,347 A | * | 12/2000 | Lin ............................. 701/214 |
| 6,317,688 B1 | * | 11/2001 | Bruckner et al. ........... 701/213 |
| 6,424,915 B1 | * | 7/2002 | Fukuda et al. .............. 701/214 |
| 6,496,779 B1 | * | 12/2002 | Hwang ........................ 701/220 |
| 6,522,266 B1 | * | 2/2003 | Soehren et al. ............. 340/988 |

FOREIGN PATENT DOCUMENTS

EP 0 368 457 A1 * 5/1990

OTHER PUBLICATIONS

Gebre–Egziabher et al.; A low–cost GPS/inertial attitude heading reference system (AHRS); Position and Navigation Symposium, IEEE 1998; Apr. 1998; pp. 518–525.*

* cited by examiner

Primary Examiner—Michael J. Zanelli
(74) Attorney, Agent, or Firm—Raymond Y. Chan; David and Raymond Patent Group

(57) ABSTRACT

A positioning and navigation method and system thereof can substantially solve the problems encountered in global positioning system-only and inertial navigation system-only, such as loss of global positioning satellite signal, sensibility to jamming and spoofing, and inertial solution's drift over time, in which the velocity and acceleration from an inertial navigation processor and an attitude and heading solution from an AHRS processor are used to aid the code and carrier phase tracking of the global positioning system satellite signals, so as to enhance the performance of the global positioning and inertial integration system, even in heavy jamming and high dynamic environments and when the GPS satellite signals are not available.

36 Claims, 9 Drawing Sheets

POSITIONING AND NAVIGATION METHOD AND SYSTEM THEREOF

BACKGROUND OF THE PRESENT INVENTION

1. Field of the Present Invention

The present invention relates to a global positioning system (GPS) and inertial measurement unit (IMU) integrated positioning and navigation method, and more particularly to an improved integration method of the global positioning system (GPS) receiver with the inertial measurement unit (IMU) and an attitude and heading reference system (AHRS), which allows the mutual aiding operation of the global positioning system (GPS) receiver and the inertial navigation system (INS) at an advanced level with features of inertial aiding global positioning system satellite signal tracking and rapid global positioning system signal carrier phase integer ambiguity resolution. Besides, whenever the GPS signals are not available, an AHRS (Attitude and Heading Reference System) processing with magnetometer data allows user to obtain a stabilized Attitude and Heading solution.

2. Description of Related Arts

U.S. Pat. Nos. 6,167,347 and 6,292,750, owned by the applicant of the present invention, suggest a positioning method and system for a vehicle or other carrier, which is a GPS/IMU integrated positioning and navigation method and system. Although it allows the mutual aiding operation of the GPS receiver and the inertial navigation system at an advanced level with features of inertial aiding GPS satellite signal tracking and rapid global positioning system signal carrier phase integer ambiguity resolution, it fails to provide a stabilized attitude and heading solution when the GPS signals are not available, such as the vehicle or carrier carrying the system is inside an enclosed structure where the GPS signals are blocked.

It is known that the global positioning system user equipment, which consists of an antenna, a signal processing unit, and associated electronics and displays, receives the signals from the global positioning system satellites to obtain position, velocity, and time solution. The global positioning system principle of operation is based on range triangulation. Because the satellite position is known accurately via ephemeris data, the user can track the satellite's transmitted signal and determine the signal propagation time. Since the signal travels at the speed of light, the user can calculate the geometrical range to the satellite. The actual range measurement (called the pseudorange) contains errors, for example, bias in the user's clock relative to global positioning system reference time. Because atomic clocks are utilized in the satellites, their errors are much smaller in magnitude than the users' clocks. Thus, for three-dimensional position determination, and also to calculate the cock bias, the pure global positioning system needs a minimum of four satellites to obtain a navigation solution.

Global positioning system GPS contains a number of error sources: the signal propagation errors, satellites errors, and the selective availability. The user range error (URE) is the resultant ranging error along the line-of-sight between the user and the global positioning system satellite. Global positioning system errors tend to be relatively constant (on average) over time, thus giving global positioning system long-term error stability. However, the signals of the global positioning system may be intentionally or unintentionally jammed or spoofed, or the global positioning system (GPS) receiver antenna may be obscured during vehicle attitude maneuvering, and the global positioning system signals may be lost when the signal-to-noise ratio is low and the vehicle is undergoing highly dynamic maneuvers.

An inertial navigation system (INS) is made up by an onboard inertial measurement unit, a processor, and embedded navigation software(s). The positioning solution is obtained by numerically solving Newton's equations of motion using measurements of vehicle specific forces and rotation rates obtained from onboard inertial sensors. The onboard inertial sensors, consisting of accelerometers and gyros, together with the associated hardware and electronics comprise the inertial measurement unit, IMU.

The inertial navigation system may be mechanized in either a gimbaled or a strapdown configuration. In a gimbaled inertial navigation system, the accelerometers and gyros are mounted on a gimbaled platform to isolate the sensors from the rotations of the vehicle, and to keep the measurements and navigation calculations in a stabilized navigation coordinated frame. Possible navigation frames include earth centered inertial (ECI), earth-centered-earth-fix (ECEF), locally level with axes in the directions of north, east, down (NED), and locally level with a wander azimuth. In a strapdown inertial navigation system, the inertial sensors are rigidly mounted to the vehicle body frame, and a coordinate frame transformation matrix (analyzing platform) is used to transform the body-expressed acceleration and rotation measurements to a navigation frame to perform the navigation computation in the stabilized navigation frame.

Gimbaled inertial navigation systems can be more accurate and easier to calibrate than strapdown inertial navigation systems. Strapdown inertial navigation systems can be subjected to higher dynamic conditions (such as high turn rate maneuvers) which can stress inertial sensor performance. However, with the availability of newer gyros and accelerometers, strapdown inertial navigation systems become the predominant mechanization due to their low cost and reliability.

Inertial navigation systems, in principle, permit pure autonomous operation and output continuous position, velocity, and attitude data of vehicle after initializing the starting position and initiating an alignment procedure. In addition to autonomous operation, other advantages of inertial navigation system include the full navigation solution and wide bandwidth. However, an inertial navigation system is expensive and subject to drift over an extended period of time. It means that the position error increases with time. This error propagation characteristic is primarily caused by its inertial sensor error sources such as gyro drift, accelerometer bias, and scale factor errors.

The inherent drawbacks of a stand-alone inertial navigation system (INS) and a stand-alone global positioning system (GPS) show that a stand-alone inertial navigation system or a stand-alone global positioning system can not meet mission requirements under some constraints such as low cost, high accuracy, continuous output, high degree of resistance to jamming and high dynamic.

In the case of integration of global positioning system with inertial navigation system, the short term accuracy of the inertial navigation system and the long term stability and accuracy of global positioning system directly complement each other.

One of the conventional integration approaches of global positioning system and inertial navigation system is to reset directly the inertial navigation system with global positioning system-derived position and velocity. The second approach is the cascaded integration where the global positioning system-derived position and velocity are used as the measurements in an integration Kalman filter. The third approach uses an extended Kalman filter processes the raw pseudorange and delta range measurements of the global positioning system to provide optimal navigation parameter error estimates of the inertial navigation system, inertial sensor errors, and the global positioning system receiver clock offset.

The shortcomings of the above existing integration approaches are:

(1) In the conventional global positioning system and inertial navigation system integration approaches, only position and velocity derived by global positioning system receiver or global positioning system raw pseudorange and delta range measurements are used. In fact, the raw carrier phase measurements of global positioning system have the highest measurement accuracy, but are not employed to contribute to an integration solution.

(2) A significant impediment to the aiding of global positioning system signal tracking loops with inertial navigation system is that the aiding causes the potential instability of the conventional global positioning system and inertial navigation integration system. The reason is that there is a positive feedback signal loop in the combined global positioning and inertial system. The accuracy degradation of the inertial aiding data increases the signal tracking errors. The increased tracking errors fed to the inertial system may cause further degradation of inertial system, because the measurements may severely affect the Kalman filter, which is well tuned for a low accuracy inertial navigation system.

(3) In conventional tightly-coupled global positioning and inertial integration system, low accurate inertial sensor can not provide global positioning system satellite signal carrier phase tracking with velocity aiding, because the aiding of carrier phase tracking loop requires high accuracy of external input velocity.

(4) When the GPS signals are not available., such as the vehicle or the carrier of the positioning system is inside an enclosed structure, e.g. a parking structure, no stabilized attitude and heading solution can be obtained.

SUMMARY OF THE PRESENT INVENTION

It is a main objective of the present invention to provide a positioning and navigation method and system thereof, in which the velocity and acceleration from an inertial navigation processor and an attitude and heading system are used to aid the code and carrier phase tracking of the global positioning system satellite signals, so as to enhance the performance of the global positioning and inertial integration system, even in heavy jamming and high dynamic environments and inside an enclosed structure where GPS signals are not available.

It is another objective of the present invention to provide a positioning and navigation method and system thereof, wherein when the GPS signals are not available, an AHRS (Attitude and Heading Reference System) processing with magnetometer data allows user to obtain a stabilized Attitude and Heading solution.

It is another objective of the present invention to provide a positioning and navigation method and system thereof, in which the velocity and acceleration from an inertial navigation processor corrected by a Kalman filter are used to aid the code and carrier phase tracking of the global positioning system satellite signals, so as to enhance the performance of the global positioning and inertial integration system, even in heavy jamming and high dynamic environments and inside an enclosed structure wherein GPS signals are blocked.

It is another objective of the present invention to provide a positioning and navigation method and system thereof in which the velocity and acceleration from an inertial navigation processor are used to aid the code and carrier phase tracking of the global positioning system satellite signals to prevent loss of satellite signal and carrier phase clips encountered in a global positioning system receiver, while the AHRS (Attitude and Heading Reference System) processing with magnetometer data when the GPS signals are not available, so as to allow user to continuously obtain the stabilized Attitude and Heading solution.

It is another objective of the present invention to provide a positioning and navigation method and system thereof, in which the velocity and acceleration from an inertial navigation processor corrected by a Kalman filter are used to aid the code and carrier phase tracking of the global positioning system satellite signals to prevent loss of satellite signal and carrier phase clips encountered in a global positioning system receiver, while the AHRS (Attitude and Heading Reference System) processing with magnetometer data when the GPS signals are not available so as to allow user to continuously obtain the stabilized Attitude and Heading solution.

It is another objective of the present invention to provide a positioning and navigation method and system thereof, in which the inertial navigation system aids the satellite signal integer ambiguity resolution of the global positioning system by providing more accurate position information while the AHRS (Attitude and Heading Reference System) processing with magnetometer data when the GPS signals are not available so as to allow user to continuously obtain the stabilized Attitude and Heading solution.

It is a further objective of the present invention to provide a positioning and navigation method and system thereof, in which the integrated navigation solution of global positioning system and inertial measurement unit aids the satellite signal integer ambiguity resolution of the global positioning system by providing more accurate position information and error covariance matrix, while the AHRS (Attitude and Heading Reference System) processing with magnetometer data when the GPS signals are not available so as to allow user to continuously obtain the stabilized Attitude and Heading solution.

It is another objective of the present invention to provide a positioning and navigation method and system thereof, in which the satellite signal carrier phase measurements are used in the Kalman filter, as well as the pseudorange and delta range of the global positioning system, so as to improve the accuracy of integration positioning solution, while the AHRS (Attitude and Heading Reference System) processing with magnetometer data when the GPS signals are not available so as to allow user to continuously obtain the stabilized Attitude and Heading solution.

Another objective of the present invention is to provide a positioning and navigation method and system thereof, in which a Kalman filter is implemented in real time to optimally blend the global positioning system raw data and the inertial navigation solution, and to estimate the navigation solution, while the AHRS (Attitude and Heading Reference System) processing with magnetometer data when the GPS signals are not available so as to allow user to continuously obtain the stabilized Attitude and Heading solution.

Another further objective of the present invention is to provide a positioning and navigation method and system thereof, in which a robust Kalman filter is implemented in real time to eliminate the possible instability of the integration solution, while the AHRS (Attitude and Heading Reference System) processing with magnetometer data when the GPS signals are not available so as to allow user to continuously obtain the stabilized Attitude and Heading solution.

Another objective of the present invention is to provide a positioning and navigation method and system thereof, in which a low accurate inertial sensor is used for achieving a high accurate integration solution due to the aiding of global positioning system measurement, while the AHRS (Attitude and Heading Reference System) processing with magnetometer data when the GPS signals are not available so as to allow user to continuously obtain the stabilized Attitude and Heading solution.

In order to accomplish the above objectives, the present invention provides a positioning and navigation method and system thereof. By incorporating with an AHRS (Attitude and Heading Reference System) processing with magnetometer data, which can substantially solve the problems encountered in global positioning system-only, inertial navigation system-only, and even GPS/IMU integrated system, such as loss of global positioning satellite signals, sensibility to jamming and spoofing, and inertial solution's drift over time, by allowing user to obtain a stabilized Attitude and Heading solution when the GPS signals are not available.

DETAILED DESCRIPTION OF THE PRESENT EMBODIMENT

Figure 1:
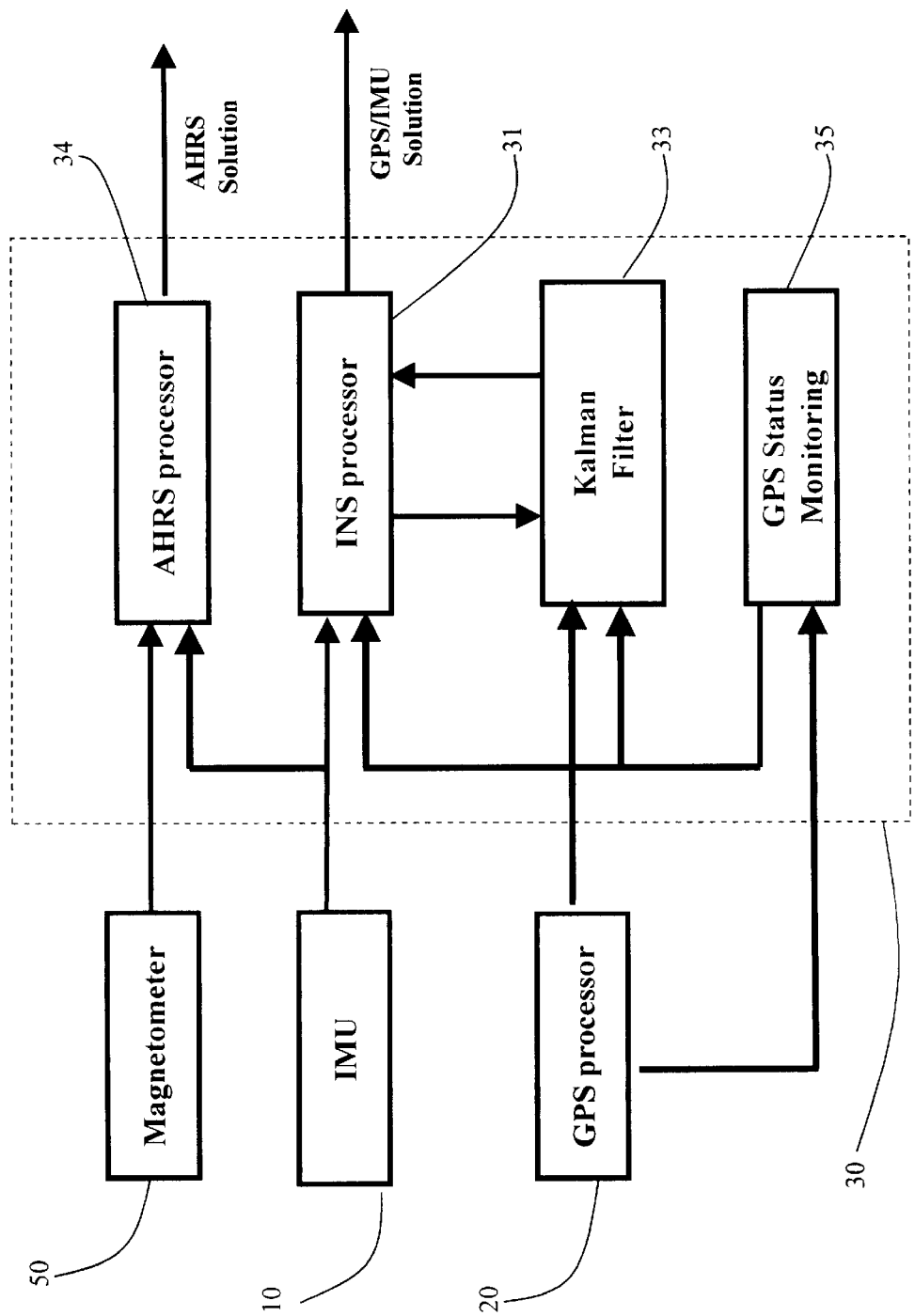
FIG. 1 is a block diagram illustrating a positioning and navigation method and system according to a preferred embodiment of the present invention, in which a global positioning system measurement, a inertial measurement, and a magnetometer measurement are blended.
Figure 2:
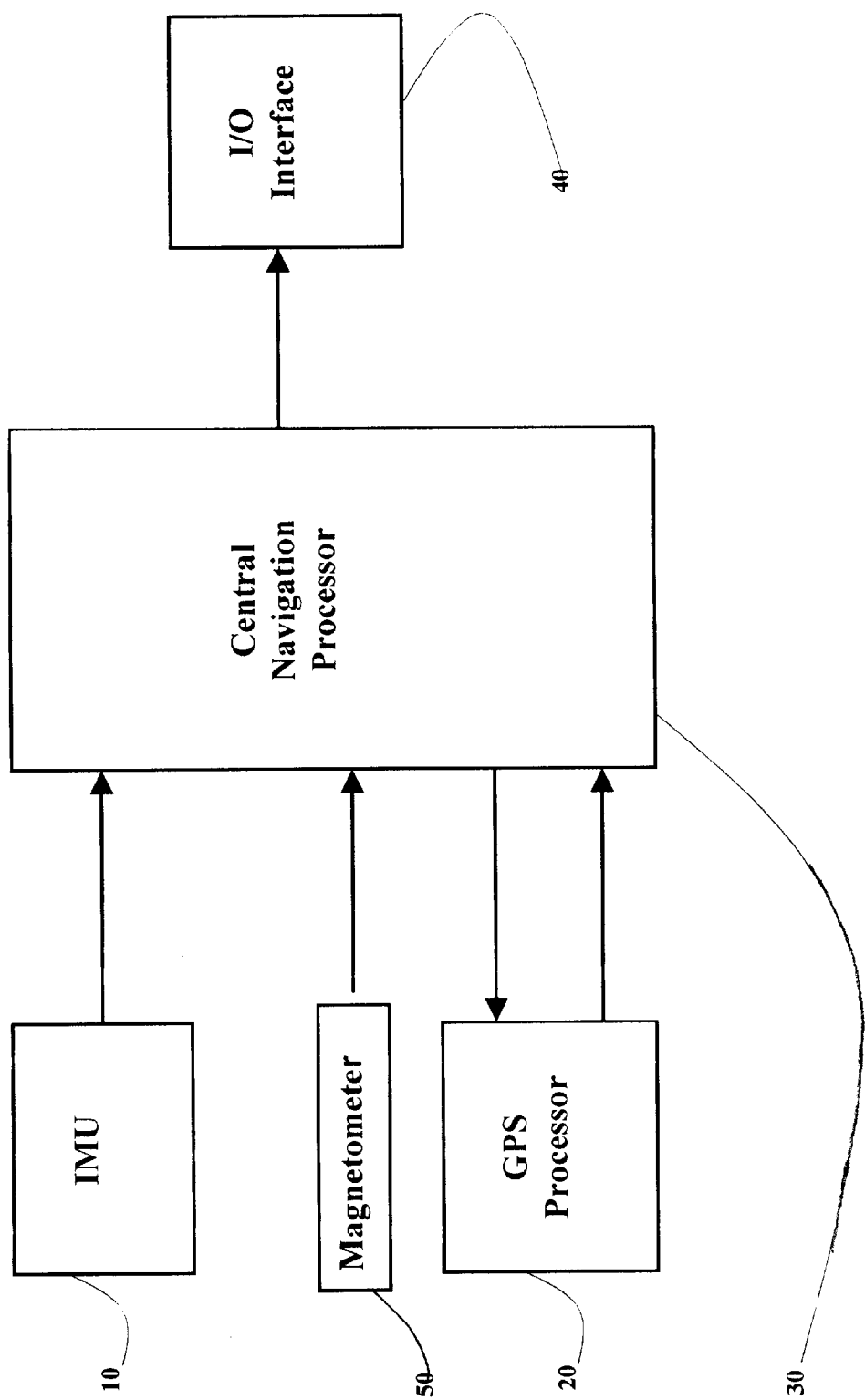
FIG. 2 is a block diagram illustrating the positioning method and system according to a preferred embodiment of the present invention, in which the global positioning system measurement, the inertial measurement, and the magnetometer measurement are blended in a central navigation processor.

Referring to FIGS. 1 to 9 of the drawings, a positioning and navigation method and system thereof is illustrated. The positioning and navigation system, as shown in FIGS. 1 and 2, of the present invention comprises an IMU (inertial measurement unit) 10, a GPS (global positioning system) processor 20, and a magnetometer 50 connected to a central navigation processor 30. The navigation solution is output to an I/O (input/output) interface 40. The central navigation processor 30 comprises an AHRS (Attitude and Heading Reference System) processor 34, an INS (Inertial Navigation System) processor 31, a Kalman filter 33 and a GPS (Global Positioning System) status monitoring unit 35 which receives the GPS signals tracking indications, wherein the positioning and navigation system of the present invention outputs AHRS solution when GPS signals are not available.

As shown in FIG. 2, the GPS processor 20 receives a plurality of GPS satellite signals to derive position and velocity information of a vehicle or a carrier that carries the system and a plurality of GPS raw measurements, including pseudorange, carrier phase, and Doppler shift, wherein the GPS raw measurements are sent to said central navigation processor 30.

The IMU 10 provides inertial measurements including body angular rates and specific forces, which are sent to the INS processor 31 for computing an inertial navigation solution which are position, velocity, acceleration, and attitude of a carrier carrying the system.

The inertial navigation solution derived from the INS processor 31 and the GPS raw measurements are blended into the Kalman filter 33 (which can alternatively be a robust Kalman filter), to derive a plurality of INS corrections and GPS corrections, wherein the INS corrections are fed back from the Kalman filter 33 to the INS processor 31 to correct the inertial navigation solution.

The I/O interface 40 receives the inertial navigation solution from the INS processor 31 to provide navigation data for an on-board system, such as an on-board avionics system when the vehicle is an airplane or a helicopter.

The magnetometer 50 generates Earth magnetic field measurement which is sent to the AHRS processor 34. The inertial measurements, including the body angular rates and specific forces, of the IMU 10 and the Earth magnetic field from the magnetometer 50 are sent to the AHRS processor 34 for computing an AHRS solution which are attitude and heading data of the vehicle or carrier. The AHRS solution is outputted as navigation data through the I/O interface 40 when GPS signals are not available.

The GPS satellites transmit the coarse acquisition (C/A) code and precision (P) code on radio frequency (RF) at L1 band:

$$S_{l1}(t) = \sqrt{2P_c} CA(t)D(t) \cos(\omega_1 t + \phi) + \sqrt{2P_P} P(t)D(t) \sin(\omega_1 t + \phi))$$

The GPS satellites transmit the precision (P) code on radio frequency (RF) at L2 band:

$S_{l2}(t)=\sqrt{2P_2}P(t)D(t)\cos(\omega_2 t+\phi_2)$ where, $\omega_1$ is the L1 radian carrier frequency, $\phi$ is a small phase noise and oscillator drift component. $P_c$ is the C/A signal power. $P_P$ is the P signal power. D(t) is the navigation data, CA(t) is the C/A code, P(t) is the P code, $\omega_2$ is the L2 radian carrier frequency. $P_2$ is the L2-P signal power, $\phi_2$ is a small phase noise and oscillator drift component.

The received signals at the GPS antenna 31 are, respectively:

$S_{l1}(t)=\sqrt{2P_c}CA(t-\tau)D(t)\cos[(\omega_1+\omega_d)t+\phi)]+\sqrt{2P_P}P(t)D(t)\sin[(\omega_1+\omega_d)t+\phi)]$ $S_{l2}(t)=\sqrt{2P_2}P(t-\tau)D(t)\cos[(\omega_2+\omega_d)t+\phi_2)]$ where, $\tau$ is the code delay, $\omega_d$ is the Doppler radian frequency.

Figure 3:
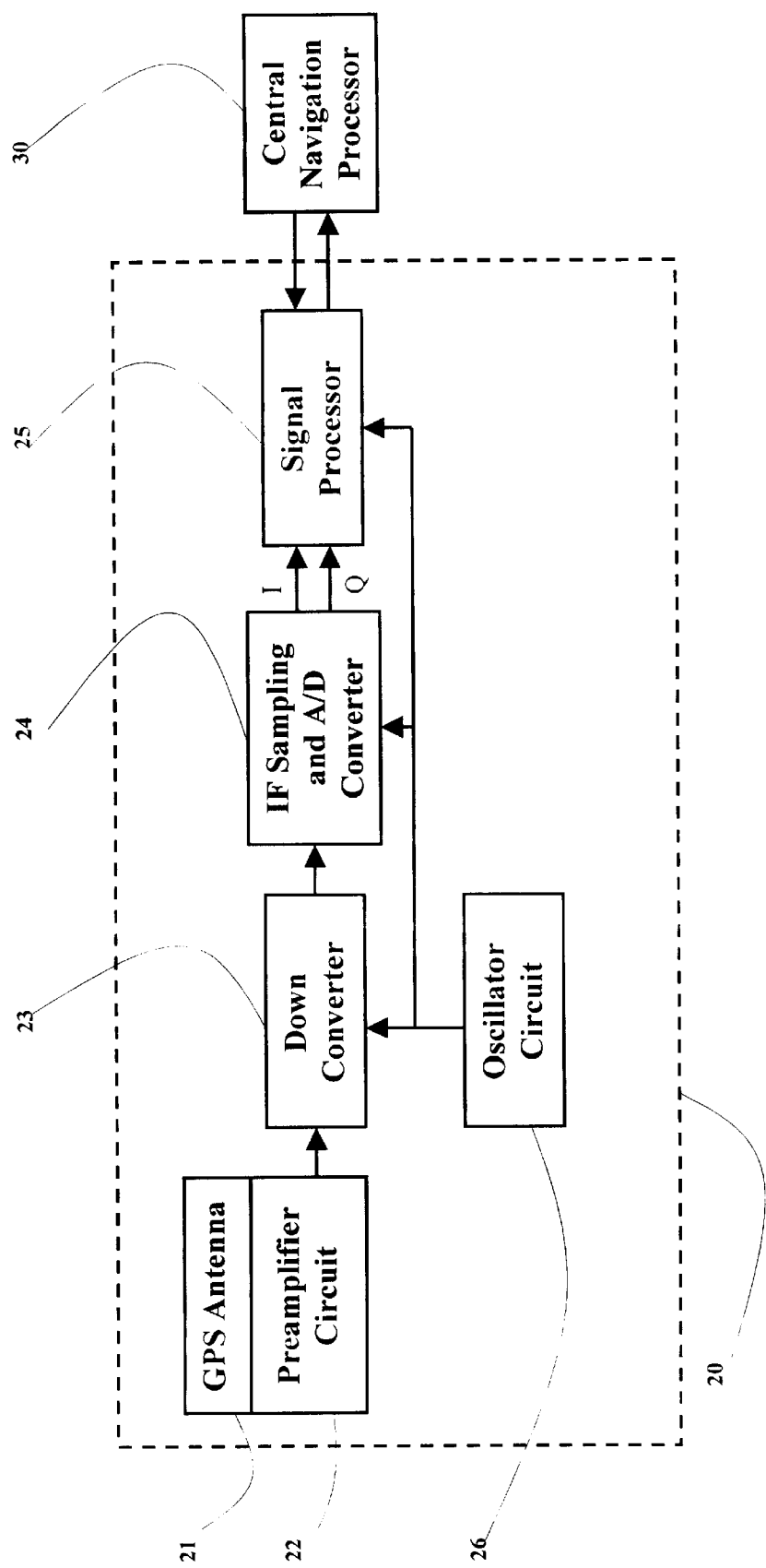
FIG. 3 is a block diagram of the global positioning system processing with external aiding from the central navigation processor according to the above preferred embodiment of the present invention.

Referring to FIG. 3, the GPS processor 20 comprises a GPS antenna 21 to receive GPS signals which are amplified by a preamplifier circuit 22. The amplified GPS signals are then passed to a down converter 23 of the GPS processor 20. The down converter 23 converts radio frequency (RF) signal to intermediate frequency (IF) signal. The IF signal is processed by an IF sampling and A/D converter 24 to convert the IF signal to that of in-phase (I) and quadraphase (Q) components of the signal envelope. In the IF sampling and A/D converter 24, the IF signal is first filtered by a low pass filter, and then sampled, finally converted from analog signal to digital data. The digital data are input into a signal processor 25 to extract the navigation data modulated on the GPS signals, such as the GPS satellite ephemeris, atmosphere parameters, satellite clock parameter, and time information. The signal processor 25 also processes the digital data from the IF sampling and A/D converter 24 to derive the pseudorange, carrier phase, and Doppler frequency shift. The GPS processor 20 further comprises an oscillator circuit 26 for providing clock signal to the down converter 23, IF sampling and A/D converter 24, and the signal processor 25.

Figure 5:
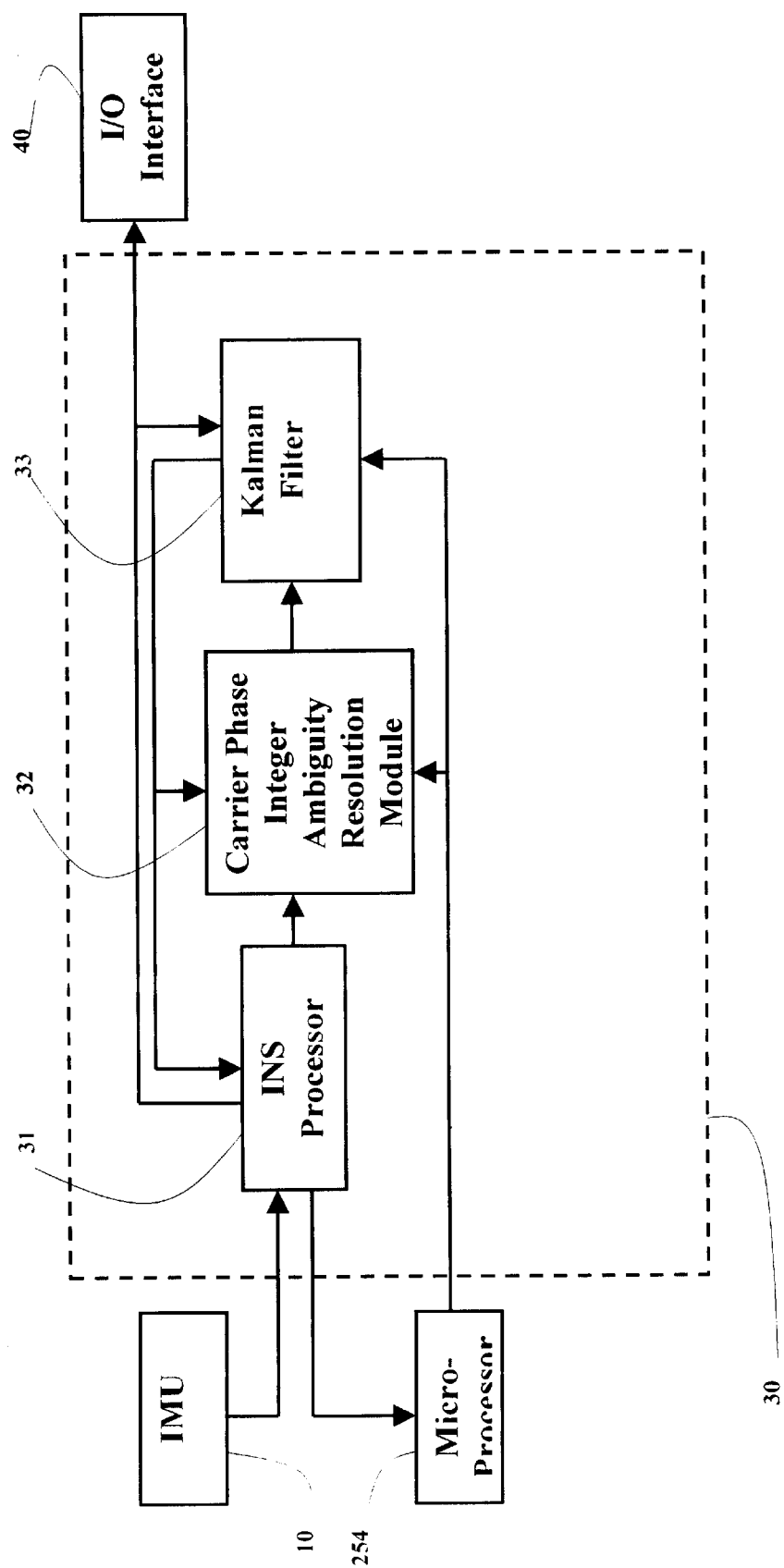
FIG. 5 is a block diagram of the central integrated navigation processing, including the global positioning system and the inertial sensor, according to the above preferred embodiment of the present invention.

The central navigation processor 30, as shown in FIGS. 1 and 5, receives the measurements coming from the IMU 10 and the microprocessor 254 of the GPS processor 20, in which the measurements are blended to derive high precision navigation information including 3-dimensional position, 3-dimensional velocity, and 3-dimensional attitude. These data are output from an INS processor 31 of the central navigation processor 30 and are passed to the I/O interface 40. Other avionics systems can read the navigation data from said I/O interface 40. As mentioned before, the velocity and acceleration informations are also fed back to the microprocessor 254 of the GPS processor 20 to aid the global positioning system satellite signal code and carrier phase tracking.

The microprocessor 254 of the GPS processor 20 outputs the pseudorange, Doppler shifts, global positioning system satellite ephemeris, as well as atmosphere parameters to the Kalman filter 33 in which the data from the INS processor 31 and the microprocessor 254 of the GPS processor 20 are integrated to derive the position error, velocity error, and attitude error. The INS processor 31 processes the inertial measurements, which are body angular rates and specific forces, and the position error, velocity error, and attitude error coming from the Kalman filter 33 to derive the corrected navigation solution. The navigation solution includes 3-dimensional position. 3-dimensional velocity, and 3-dimensional attitude. These data are output into the Kalman filter 33. On the other hand, these data are also passed to the I/O interface 40 which provides a navigation data source for other avionics systems on board a vehicle where these avionics systems need navigation data or part of these data.

In some applications, the GPS signals may be not available due to body shield and heavy jamming and high dynamic. Moreover, in worse case, GPS signals may be still not available, although the IMU data provides the aiding of the GPS reception. To address this problem, the present invention provides an AHRS solution to compensate this situation.

Figure 9:
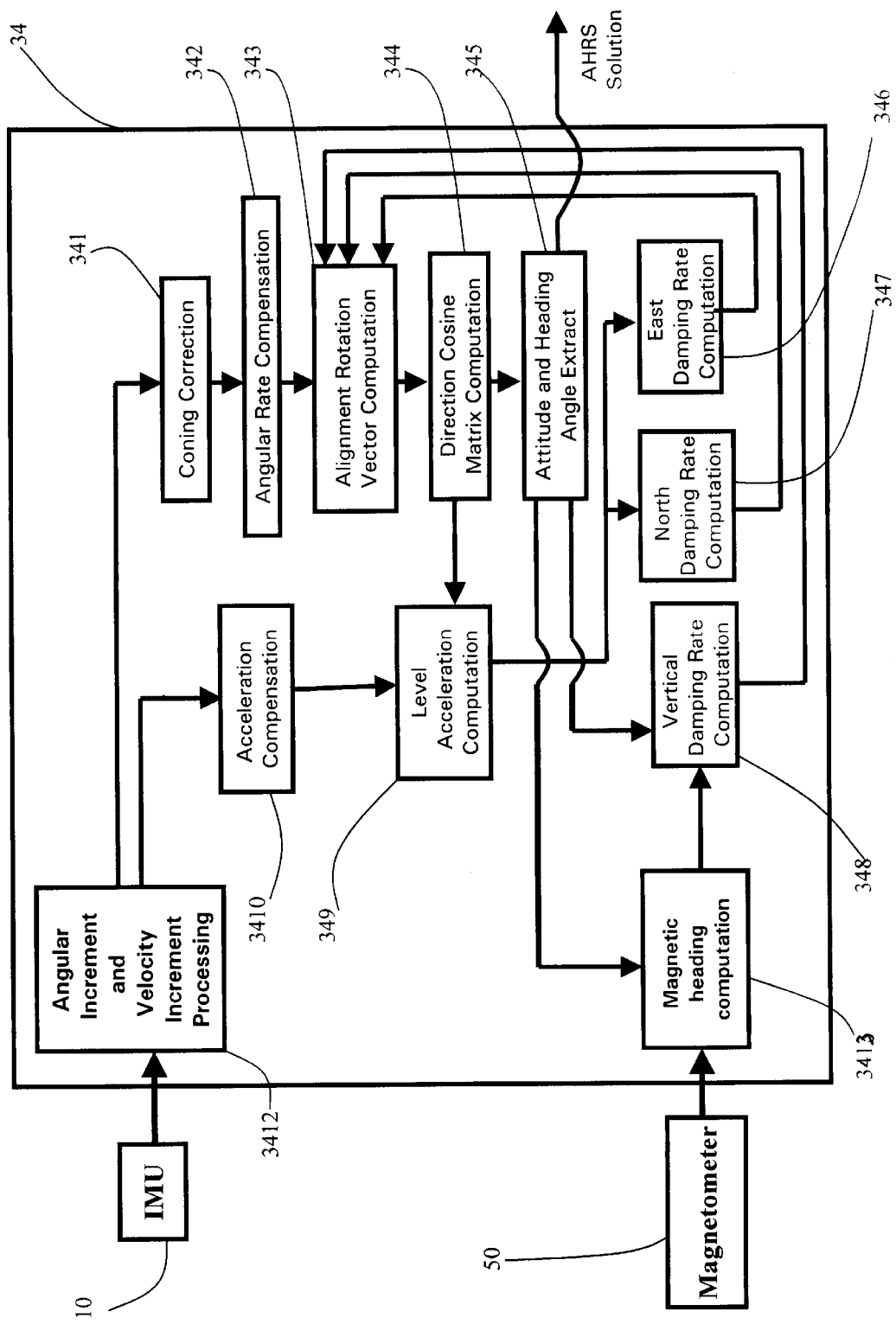
FIG. 9 is a block diagram of the AHRS (Attitude and Heading Reference System) processing according to the above preferred embodiment of the present invention.

Referring to FIGS. 1 and 9, the AHRS processor 34 comprises an angular increment and velocity increment processing module 3412 which receives body angular rates and specific forces from the IMU 10 to produce three-axis angular increment values and three-axis velocity increment values.

The three-axis angular increment values from the angular increment and velocity increment processing module 3412 and coarse angular rate bias obtained from an IMU calibration procedure at a high data rate (short interval) are connected to a coning correction module 341 for computing coning effect errors in the coning correction module 341 using the three-axis angular increment values and coarse angular rate bias and outputting three-axis coning effect terms and three-axis angular increment values at reduced data rate (long interval), which are called three-axis long-interval angular increment values, into an angular rate compensation module 342.

The coning effect errors and three-axis long-interval angular increment values from the coning correction module 341 and angular rate device misalignment parameters and fine angular rate bias from the IMU calibration procedure are connected to the angular rate compensation module 342 for compensating definite errors in the three-axis long-interval angular increment values using the coning effect errors, angular rate device misalignment parameters, fine angular rate bias, and coning correction scale factor, and outputting the real three-axis angular increments to an alignment rotation vector computation module 343.

The three-axis velocity increment values from the angular increment and velocity increment processing module 3412 and acceleration device misalignment, and acceleration device bias from the IMU calibration procedure are connected into an accelerometer compensation module 3410 for compensating the definite errors in three-axis velocity increments using the acceleration device misalignment and accelerometer bias; outputting the compensated three-axis velocity increments to a level acceleration computation module 349.

By using the compensated three-axis angular increments from the angular rate compensation module 342, an east damping rate increment from an east damping rate computation module 346, a north damping rate increment from a north damping rate computation module 347, and vertical damping rate increment from a vertical damping rate computation module 348, a quaternion, which is a vector representing rotation angle of the carrier, is updated, and the updated quaternion is connected to a direction cosine matrix computation module 344 for computing the direction cosine matrix, by using the updated quaternion.

The computed direction cosine matrix is connected to the level acceleration computation module 349 and an attitude and heading angle extract module 345 for extracting attitude and heading angle as the AHRS solution, using the direction cosine matrix from the direction cosine matrix computation module 344.

The compensated three-axis velocity increments are connected to the level acceleration computation module 349 for computing level velocity increments using the compensated three-axis velocity increments from the acceleration compensation module 3410 and the direction cosine matrix from the direction cosine matrix computation module 344.

The level velocity increments are connected to the east damping rate computation module 346 for computing east damping rate increments using the north velocity increment of the input level velocity increments from the level acceleration computation module 349.

The level velocity increments are connected to the north damping rate computation module 347 for computing north damping rate increments using the east velocity increment of the level velocity increments from the level acceleration computation module 349.

The earth magnetic field measurements in three axes from the magnetometer 50 and attitude data (pitch and roll) from the attitude and heading angle extract module 345 are connected to a magnetic heading computation module 3413 to produce a measured magnetic heading angle, The heading angle from the attitude and heading angle extract module 345 and the measured magnetic heading angle from the magnetic heading computation module 3413 are connected to the vertical damping rate computation module 348 for computing vertical damping rate increments.

The east damping rate increments, north damping rate increments, and vertical damping rate are fed back to the alignment rotation vector computation module 343 to damp the drift of errors of the attitude and heading angles.

Figure 4:
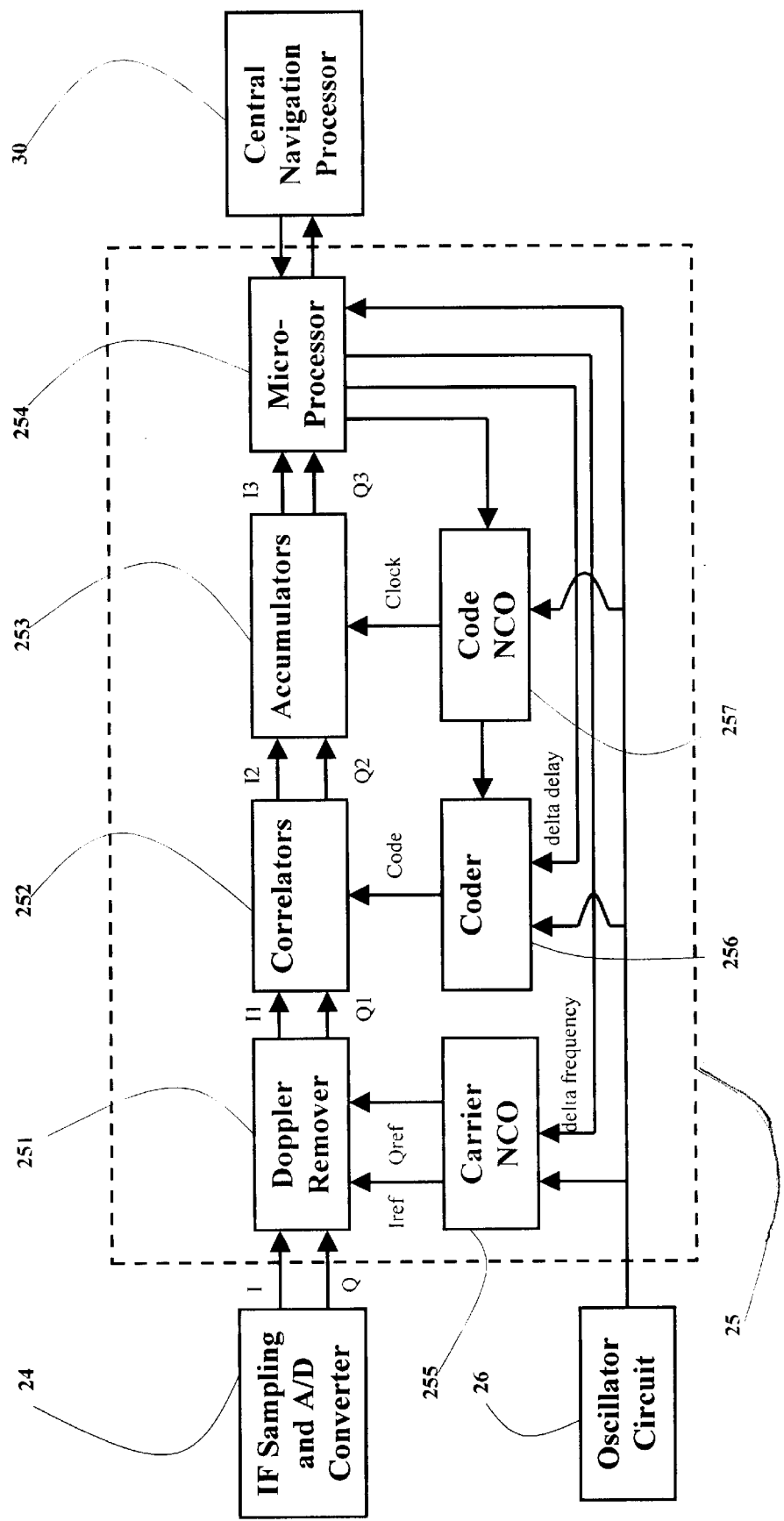
FIG. 4 is a block diagram of the global positioning system signal processing with external aiding from the central navigation processor according to the above preferred embodiment of the present invention.

Referring to FIG. 4, the pseudorange measurements are derived from the GPS code tracking loop which consists of a correlators 252, an accumulators 253, the micro-processor 254, a code NCO (numerical controlled oscillator) 257, and a coder 256. The Doppler shift and carrier phase measurements are obtained from the GPS satellite signal carrier phase tracking loop which consists of a Doppler remover 251, the correlators 252, the accumulators 253, the microprocessor 254, and a carrier NCO (numerical controlled oscillator) 255.

The digital data (I and Q) from the IF sampling and A/D converter 24 is processed by the Doppler remover 251 to remove the Doppler shift modulated on the GPS satellite signal. The Doppler remover 251 is used by the carrier tracking loop to track the phase and frequency of the incoming signal. "The Doppler removal is accomplished with a digital implementation of a single sideband modulator. The carrier NCO 255 accumulates phase at its clocking rate based upon a frequency number input. Every time its accumulator rolls over, a new cycle is generated. The time that it takes to do this is a cycle period"[1]. The clock from the oscillator circuit 26 and the delta frequency from the microprocessor 254 drive the carrier NCO 255. The carrier NCO 255 outputs in-phase and quadraphase components of reference phase (Iref and Qref). The reference phase is output to the Doppler remover 251.

[1] Van Dierendonck, A. J. (Chapter 8 author), "GPS Receivers." In Chapter 8 of Global Positioning System: Theory and Applications, Volume I, AIAA, Inc., 1996, P.356.

The GPS satellite signal after Doppler removal processing is passed to the correlators 252 in which the correlation process is performed. "The accumulators 253 follow the correlators 252 which makes up the postcorrelation processing and filter the correlated signal components (I2 and Q2) prior to processing in the microprocessor 254. The accumulation process is simply the accumulation of the correlated samples over T seconds, where T is usually a C/A code epoch periods of one ms. The accumulations (I3 and Q3) are stored and collected by the microprocessor 254, and the accumulators 253 are dumped, resulting in an accumulated-an-dump filtering of the signal components."[2]

[2] Ibid., P.363

The code used in the correlators 252 comes from the coder 256 which is driven by the clock from the oscillator 26 and the delta delay from the microprocessor 254. The coder 256 is responsible for generation of C/A code and/or P code. The accumulators 253 are driven by the clock generated from a code NCO 257 which is driven by the oscillator circuit 26 and the microprocessor 254. The code NCO 257 also drives the coder 256.

The microprocessor 254 has two working modes: (1) receiving data from the accumulators 253 to perform loop filtering, acquisition processing, lock detection, data recovery, and measurement processing; (2) receiving data from the accumulators 253 and the velocity and acceleration data from navigation processor 30 to perform loop filtering, acquisition processing, lock detection, data recovery, and measurement processing. The second working mode is referred to as velocity-acceleration aiding carrier phase and code tracking.

When the tracking error of GPS signal in the signal tracking loop of the signal processor 25 is larger than the tracking bandwidth of the signal tracking loop, the loss of GPS satellite signal occurs. A loss of lock status of the tracking loop is mainly caused by the low signal-noise ratio (SNR) and Doppler drift of the received satellite signals. The former may be generated by inputting noise or jamming. The latter, Doppler drift, is caused by high-speed movement of the vehicle. Generally, the expansion of the bandwidth of the tracking loop can improve the Phase-Locked Loop (PLL) tracking capability in a high dynamic environment but simultaneously can corrupt anti-interference capability of the GPS receiving set because more unwanted noise signals are allowed to enter the GPS signal tracking loops. The aiding of GPS signals with corrected INS (inertial navigation system) solution is to obtain an optimal trade-off between GPS tracking loop bandwidth and anti-jamming capabilities.

Referring to the second working mode of the microprocessor, the purpose of the corrected INS velocity-acceleration information aided GPS PLL loop is to estimate the carrier phase of the intermediate frequency signal $\theta_I(t)$ rapidly and accurately over a sufficiently short estimation period, and wherein $\theta_I(t)$ is approximated by $$\theta_I(t)=\theta_{I0}+\omega_{I0}t+\gamma_{I0}t^2+\delta_{I0}t^3+\ldots$$

The problem now becomes to estimate the parameters of the above equation. The velocity-acceleration information, which describes the flight vehicle dynamic characteristics, is translated into the line-of-sight (LOS) velocity-acceleration information. Therefore, the estimate of the carrier phase of the intermediate frequency signal can be formulated by LOS velocity-acceleration values as follows:

$$\hat{\theta}(t)=b_1 V^{LOS}t+b_2 A^{LOS}t^2+b_3 a^{LOS}t^3+\ldots$$

where ($b_1$, $b_2$, $b_3$) are constants related to the carrier frequency and the speed of light, and are given by $$b_1 = \frac{4\pi f_c}{c}, b_2 = \frac{2\pi f_c}{c}, b_3 = \frac{4\pi f_c}{3c}$$

$V^{LOS}$, $A^{LOS}$ and $a^{LOS}$ correspond to the range rate, the range acceleration and the range acceleration rate along the LOS between the satellites and the receiver. Therefore, the tracking and anti-interference capabilities of the aided PLL loop seriously depend on the accuracy of $V^{LOS}$ and $A^{LOS}$ estimation. The $V^{LOS}$ and $A^{LOS}$ can be calculated from the information of velocity and acceleration coming from the INS processor 31 and then be incorporated into the loop filter in the microprocessor 254.

The code tracking loop of the signal processing 25 tracks the code phase of the incoming direct sequence spread-spectrum signal. The code tracking loop provides an estimate of the magnitude of time shift required to maximize the correlation between the incoming signal and the internally generated punctual code. This information of time delay is used by the microprocessor 254 to calculate an initial vehicle-to-satellite range estimate, known as the pseudorange. The information of velocity and acceleration coming from the central navigation processor 30 is transformed into the LOS velocity and acceleration ($V^{LOS}$ and $A^{LOS}$) which are used to precisely estimate the code delay. By this way, the dynamic performance and anti-jamming capability are enhanced.

Figure 6:
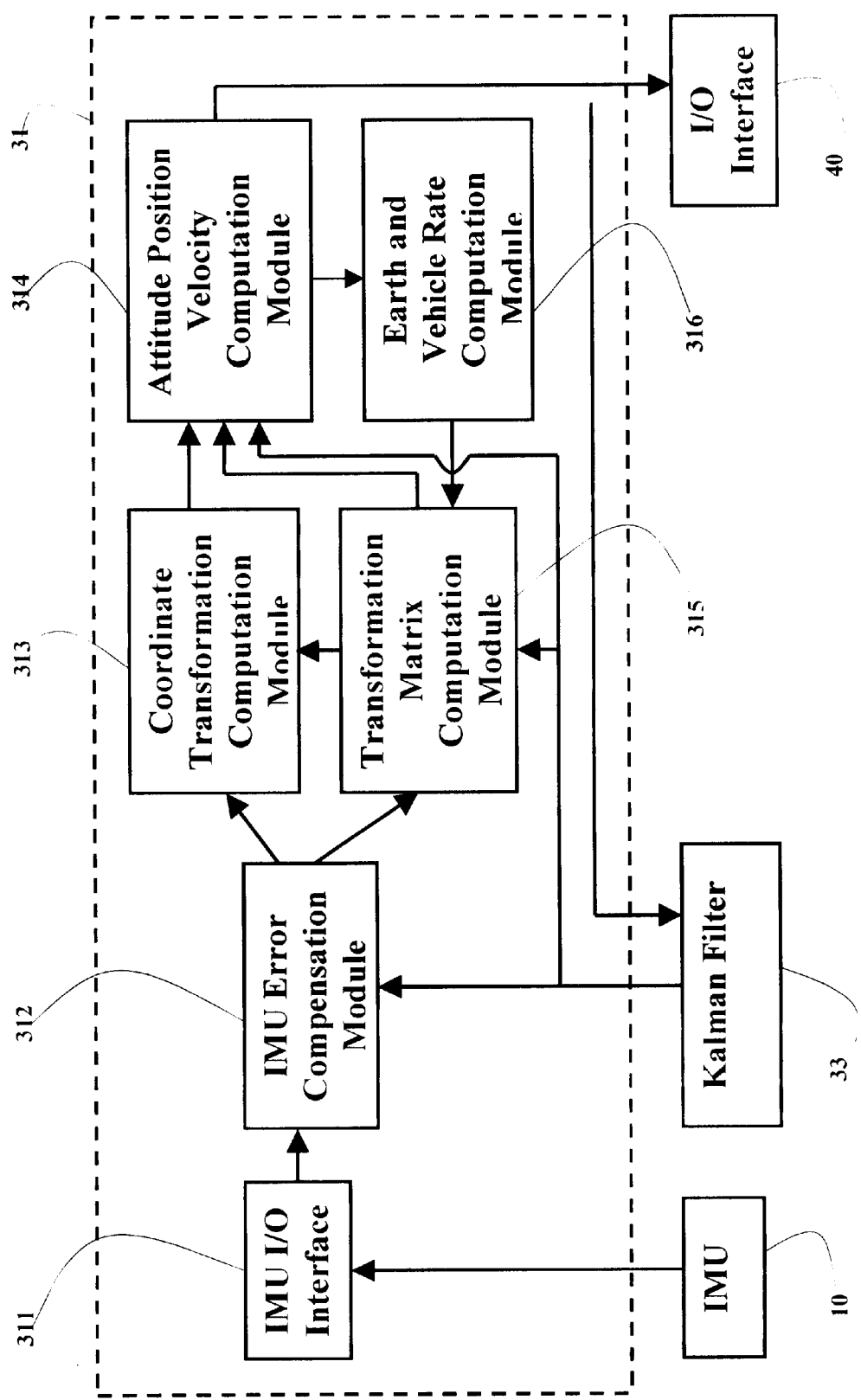
FIG. 6 is a block diagram of the inertial navigation system processing, which receives the navigation state corrections from a Kalman filter according to the above preferred embodiment of the present invention.

Referring to FIG. 6, the INS processor 31 comprises an IMU I/O interface 311, an IMU error compensation module 312, a coordinate transformation computation module 313, an attitude position velocity computation module 314, a transformation matrix computation module 315, and an earth and vehicle rate computation module 316.

The IMU I/O interface 311 collects the signal of the body angular rates and specific forces from the IMU 10 for processing and converting it to digital data. These digital data are corrupted by the inertial sensor measurement errors. These contaminated data are passed to the IMU error compensation module 312. The IMU error compensation module 312 receives the sensor error estimates derived from the Kalman filter 33 to perform IMU error mitigation on the IMU data. The corrected inertial data are sent to coordinate transformation computation module 313 and the transformation matrix computation module 315, where the body angular rates are sent to the transformation matrix computation module 315 and the specific forces are sent the coordinate transformation computation module 313.

The transformation matrix computation module 315 receives the body angular rates from the IMU error compensation module 312 and the earth and vehicle rate from the earth and vehicle rate computation module 316 to perform transformation matrix computation. The transformation matrix computation module 315 sends the transformation matrix to the coordinate transformation computation module 313 and attitude position velocity computation module 314. The attitude update algorithm in the transformation matrix computation module 315 uses the quaternion method because of its advantageous numerical and stability characteristics. The differential equation of the relative quaternion between the body frame and the local navigation frame is:

$$\dot{q} = \tfrac{1}{2}[\Omega_b]q - \tfrac{1}{2}[\Omega_n]q$$

where, $q^T = [q_0\ q_1\ q_2\ q_3]$ is a four-component vector of quaternion parameters, and $\Omega_b$ is the skew-symmetric matrix of the vector. $\omega_{ib}^b$, which is sensed by the gyro and is the rotation rate vector of the body frame (b) relative to the inertial frame (i) in the body frame.

$$[\Omega_b] = \begin{bmatrix} 0 & -\omega_{bx} & -\omega_{by} & -\omega_{bz} \\ \omega_{bx} & 0 & \omega_{bz} & -\omega_{by} \\ \omega_{by} & -\omega_{bz} & 0 & \omega_{bx} \\ \omega_{bz} & \omega_{by} & -\omega_{bx} & 0 \end{bmatrix}, \quad \omega_{ib}^b = [\omega_{bx}, \omega_{by}, \omega_{bz}]^T$$

$\Omega_n$ is the skew-symmetric matrix of the vector, $\omega_m^n$, which is the rotation rate vector of the local navigation frame (n) relative to the inertial frame in the navigation frame.

$$[\Omega_n] = \begin{bmatrix} 0 & -\omega_{nx} & -\omega_{ny} & -\omega_{nz} \\ \omega_{nx} & 0 & \omega_{nz} & -\omega_{ny} \\ \omega_{ny} & -\omega_{nz} & 0 & \omega_{nx} \\ \omega_{nz} & \omega_{ny} & -\omega_{nx} & 0 \end{bmatrix}, \quad \omega_{in}^b = [\omega_{nx}, \omega_{ny}, \omega_{nz}]^T$$

If the navigation frame is the local, level North, East and Down (NED) navigation frame, then:

$$\omega_{in}^n = \begin{bmatrix} (\omega_e + \dot{\lambda})\cos L \\ -\dot{L} \\ -(\omega_e + \dot{\lambda})\sin L \end{bmatrix}$$

where, $\omega_e$ is the Earth's rotation rate, L is the geodetic latitude, and $\lambda$ is the longitude The coordinate transformation module 313 collects the specific forces from the IMU error computation module 312 and the transformation matrix from the transformation matrix computation module 315 to perform the coordinate transformation. The coordinate transformation computation sends the specific forces transferred into the coordinate system presented by the transformation matrix to the attitude position velocity computation module 314.

The attitude position velocity computation module 314 receives the transformed specific forces from the coordinate transformation computation module 313 and the transformation matrix from the transformation matrix computation module 315 to perform the attitude, position, velocity update. A general navigation equation that describes the motion of a point mass over the surface of the Earth or near the Earth has the following form:

$$\dot{V}(t) = u - (2\omega_{ie} + \omega_{en}) \times V - \omega_{ie} \times \omega_{ie} \times r$$

where, a and V are the acceleration and velocity of the vehicle relative to the Earth in the navigation frame, and $\omega_{ie}$ is the Earth rotation vector, and $\omega_{en}$ is the angular rate of the navigation frame relative to the earth, and r is the position vector of the vehicle with respect to the Earth's center.

Because the accelerometers do not distinguish between vehicle acceleration and the mass attraction gravity, the specific vector, f, sensed by the accelerometers is:

$$f = a - g(r)$$

where, g(r) is a combination of the earth's gravity and the centrifugal force at the vehicle location. Thus, $$\dot{V}(t) = f - (2\omega_{ie} + \omega_{en}) \times V + g(r)$$

$$\text{where,}\quad \omega_{ie}^n = \begin{bmatrix} \omega_e \cos L \\ 0 \\ -\omega_e \sin L \end{bmatrix}, \quad \omega_{en}^n = \begin{bmatrix} \dot{\lambda}\cos L \\ -\dot{L} \\ -\dot{\lambda}\sin L \end{bmatrix}.$$

The vehicle velocity is updated by the following:

$$\dot{V}^n = C_b^n f^b + MV^n + g^n$$

where, $C_b^n$ is the direction cosine matrix from the body frame to the navigation frame, and $$V^n = \begin{bmatrix} v_n \\ v_e \\ v_d \end{bmatrix}, \quad f^b = \begin{bmatrix} f_{bx} \\ f_{by} \\ f_{bz} \end{bmatrix}, \quad g^n = \begin{bmatrix} 0 \\ 0 \\ g_d \end{bmatrix},$$

$$M = \begin{bmatrix} 0 & -(2\omega_e + \dot{\lambda})\sin L & \dot{L} \\ (2\omega_e + \dot{\lambda})\sin L & 0 & (2\omega_e + \dot{\lambda})\cos L \\ -\dot{L} & -(2\omega_e + \dot{\lambda})\cos L & 0 \end{bmatrix}$$

Using the normal gravity formula for the WGS-84 ellipsoid results in the following expressions:

$$g_d = g_0 \left[ 1 - 2(1 + f + m)\frac{h}{a} + \left(\frac{5}{2}m - f\right)\sin^2 L \right]$$

$(m = (\dot{i})_{ie}^2 a^2 b / GM)$ where, $g_0$ is the gravity at the equator, f is the elliptical flattening, h is the altitude, a is the semi-major axis value, b is the semi-minor axis value, GM is the earth's gravitational constant.

The differential equations for the position update of the geodetic latitude, L, longitude, $\lambda$, and height, h, are given by:

$$\dot{L} = \frac{V_n}{R_M + h}, \quad \dot{\lambda} = \frac{V_e}{(R_N + h)\cos L}, \quad \dot{h} = -v_d$$

where, $R_M$ is the radius of the curvature in the Meridian, $R_N$ is the radius of the prime vertical.

After the computation of the position and velocity, the position and velocity errors calculated by the Kalman filter 33 are used in the attitude position velocity computation module 314 to correct the inertial solution. For the attitude correction, the following two approaches can be applied. First approach is to send the attitude errors computed by the Kalman filter 33 to the attitude position velocity computation module 314 to perform attitude correction in the attitude position velocity computation module 314. The second approach is to send the attitude errors computed by the Kalman filter 33 to the transformation matrix computation module 315 to perform the attitude correction before the attitude position velocity computation module 314.

The corrected inertial solution obtained from the attitude position velocity computation module 314 is passed to the Kalman filter 33 to construct the measurements of the Kalman filter 33. The corrected inertial navigation solution is also sent to the carrier phase integer ambiguity resolution module 32 to aid the global positioning system satellite carrier phase integer ambiguity fixing. The corrected velocity and accelerate is passed to microprocessor 254 of the GPS processor 20 to aid the global positioning system satellite signal carrier phase and code tracking. The attitude, position, and velocity information is send to the I/O interface 40 which provides a navigation data source for other avionics systems onboard a vehicle.

The attitude, position, and velocity computed by the attitude position velocity computation module 314 are sent to the earth and vehicle rate computation module 316 to calculate the Earth rotation and the vehicle rotation rate. The calculated Earth and vehicle rates are sent to the transformation matrix computation module 315.

It is well known that the Kalman filter produces optimal estimates with well defined statistical properties. The estimates are unbiased and they have minimum variance within the class of linear unbiased estimates. The quality of the estimates is however only guaranteed as long as the assumptions underlying the mathematical model hold. Any misspecification in the model may invalidate the results of filtering and thus also any conclusion based on them.

In the positioning and navigation method and system thereof, an alternative for a Kalman filter for position and attitude derivation is a robust Kalman filter as mentioned above. This robust Kalman filter is stable enough to operate in more than one dynamical environment. If the dynamics change drastically, or if a sensor failure occurs, for example, a GPS satellite signal failure or an inertial sensor signal failure, the filter must detect, rectify and isolate the failure situation.

A robust filter has the characteristic that it provides near-optimum performance over a large class of process and measurement models. The pure Kalman filter is not robust since it is optimal for only one particular process and measurement model. If the filter is not correct the filter covariance may report accuracy which is different from what can actually be achieved. The purpose of filter integrity is to ensure that the predicted performance from the error covariance is close to the actual estimation error statistics. In addition, filter divergence is usually caused by a changing process or measurement model or a sensor failure.

This present invention uses a residual monitoring method to obtain a robust Kalman filter which is used to blend the global positioning system raw data and the inertial sensor measurements. When the proper redundancy is available, residual monitoring schemes can efficiently detect hard and soft failures and filter divergence. One benefit of the residual monitoring approach is that when the filter model is correct, the statistical distribution of the residual sequence is known. Thus, it is easy to generate a measurement editing and divergence detection scheme using a test-of-distribution on the measurement residuals. The same statistics can be used to assess the filter tuning and adjust the size of the covariance when divergence is detected. FIG. 6 gives the implementation of this robust Kalman filter including a residues monitor function.

Figure 7:
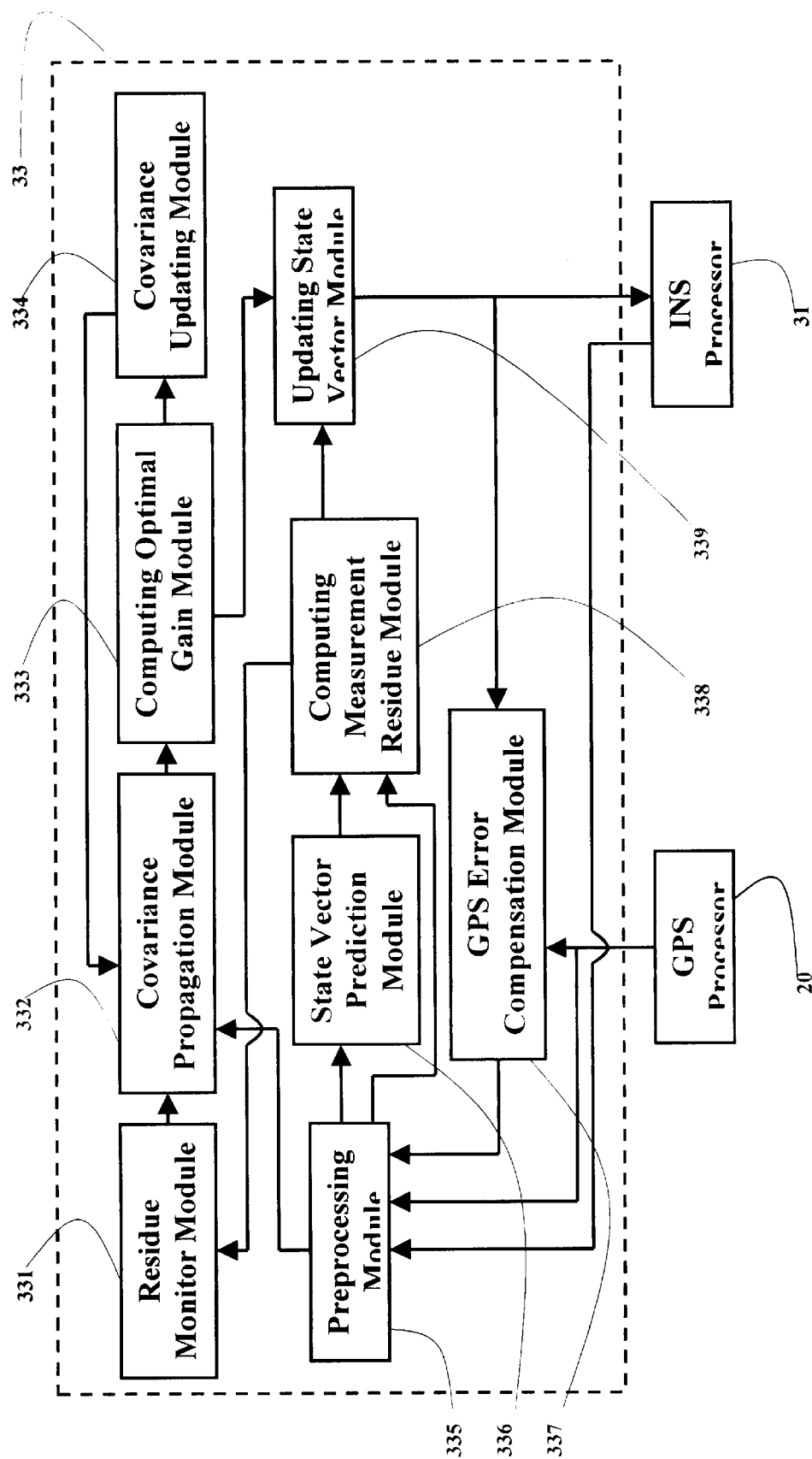
FIG. 7 is a block diagram of the robust Kalman filter implementation according to the above preferred embodiment of the present invention.

As shorn in FIG. 7, a GPS error compensation module 337 gathers the GPS raw measurements including pseudorange, carrier phase and Doppler frequency from the GPS processor 20, and the position and velocity corrections from a updating state vector module 339 to perform GPS error compensation. The corrected GPS raw data are sent to the preprocessing module 335.

A preprocessing module 335 receives the GPS satellite ephemeris from the GPS processor 30, the corrected GPS raw data including pseudorange, carrier phase, and Doppler frequency from a GPS error compensation module 337, and INS solutions from the INS processor 31. The preprocessing module 335 performs the calculation of the state transit matrix and sends it as well as the previous state vector to a state vector prediction module 336. The calculated state transit matrix is also sent to a covariance propagation module 332. The preprocessing module 335 calculates the measurement matrix and the current measurement vector according to the computed measurement matrix and the measurement model. The measurement matrix and the computed current measurement vector are passed to a computing measurement residue module 338.

The state vector prediction module 336 receives the state transit matrix and the previous state vector from the preprocessing module 335 to perform state prediction of current epoch. The predicted current state vector is passed to the computing measurement residue module 338.

The computing measurement residue module 338 receives the predicted current state vector from the state vector prediction module 336 and the measurement matrix and the current measurement vector from the preprocessing module 335. The computing measurement residue module 338 calculates the measurement residues by subtracting the multiplication of the measurement matrix and the predicted current state vector from the current measurement vector. The measurement residues are sent to a residue monitor module 331 as well as the updating state vector module 339.

The residue monitor module 331 performs a discrimination on the measurement residues received from the computing measurement residue module 338. The discrimination law is whether the square of the measurement residues divided by the residual variance is larger than a given threshold. If the square of the measurement residues divided by the residual variance is larger than this given threshold, the current measurement may leads to the divergence of the Kalman filter. When it occurs, the residue monitor module 331 calculates a new covariance of system process or rejects the current measurement. If the square of the measurement residues divided by the residual variance is less than this given threshold, the current measurement can be used by the Kalman filter without changing current covariance of system process to obtain the current navigation solution. The covariance of system process is sent to the covariance propagation module 332.

The covariance propagation module 332 gathers the covariance of system process from the residue monitor module 331, the state transit matrix from the preprocessing module 335, and the previous covariance of estimated error to calculate the current covariance of the estimated error. The computed current covariance of the estimated error is sent to a computing optimal gain module 333.

The computing optimal gain module 333 receives the current covariance of the estimated error from the covariance computing module 332 to compute the optimal gain. This optimal gain is passed to a covariance updating module 334 as well as the updating state vector module 339. The covariance updating module 334 updates the covariance of the estimated error and sends it to the covariance propagation module 332.

The updating state vector receives the optimal gain from the computing optimal gain module 333 and the measurement residues from the computing measurement residue module 338. The updating state vector calculates the current estimate of state vector including position, velocity and attitude errors and sends them to the GPS error compensation module 337 and the INS processor 31.

It is well known that more accurate positioning with GPS is obtained by use of carrier phase measurement than by use of pseudorange measurements only. This is because at the global positioning system satellite L1 broadcasting frequency, 1575.42 MHz, one cycle of carrier is only 19 centimeters as compared to that of one cycle of the C/A code which is around 300 meters. The high accuracy of positioning with GPS carrier phase measurement is based on the prior condition that the phase ambiguities have been solved. The ambiguity inherent with phase measurements depends upon both the global positioning system receiver and the satellite. Under the ideal assumptions of no carrier phase tracking error and the known true locations of the receiver and satellite, the ambiguity can be resolved instantaneously through a simple math computation. However, there is the presence of satellite ephemeris error, satellite clock bias, atmospheric propagation delay, multi-path effect, receiver clock error and receiver noise in range measurements from GPS code tracking loop, we can only get a non-precise geometric distance from the receiver to the satellite which is called a code pseudorange.

The advantage of the IMU aiding phase ambiguity resolution and cycle slip detection is that the precision vehicle coordinates and velocity from the corrected INS solution are available to aid in determining the original ambiguities and the search volume. Additionally, the INS aiding signal tracking enhances the receiver's capability to hold the global positioning system satellite signal, thus the probability of signal loss or cycle slip is reduced.

Referring to FIG. 4, the carrier phase integer ambiguity resolution module 32 collects the position and velocity data from the INS processor 31, the carrier phase and Doppler shift measurement from the microprocessor 254 of the GPS processor 20, and the covariance matrix from the Kalman filter 33 to fix the global positioning system satellite signal integer ambiguity number. After fixing of carrier phase ambiguities, the carrier phase ambiguity number is passed to the Kalman filter 33 to further improve the measurement accuracy of the global positioning system raw data.

Figure 8:
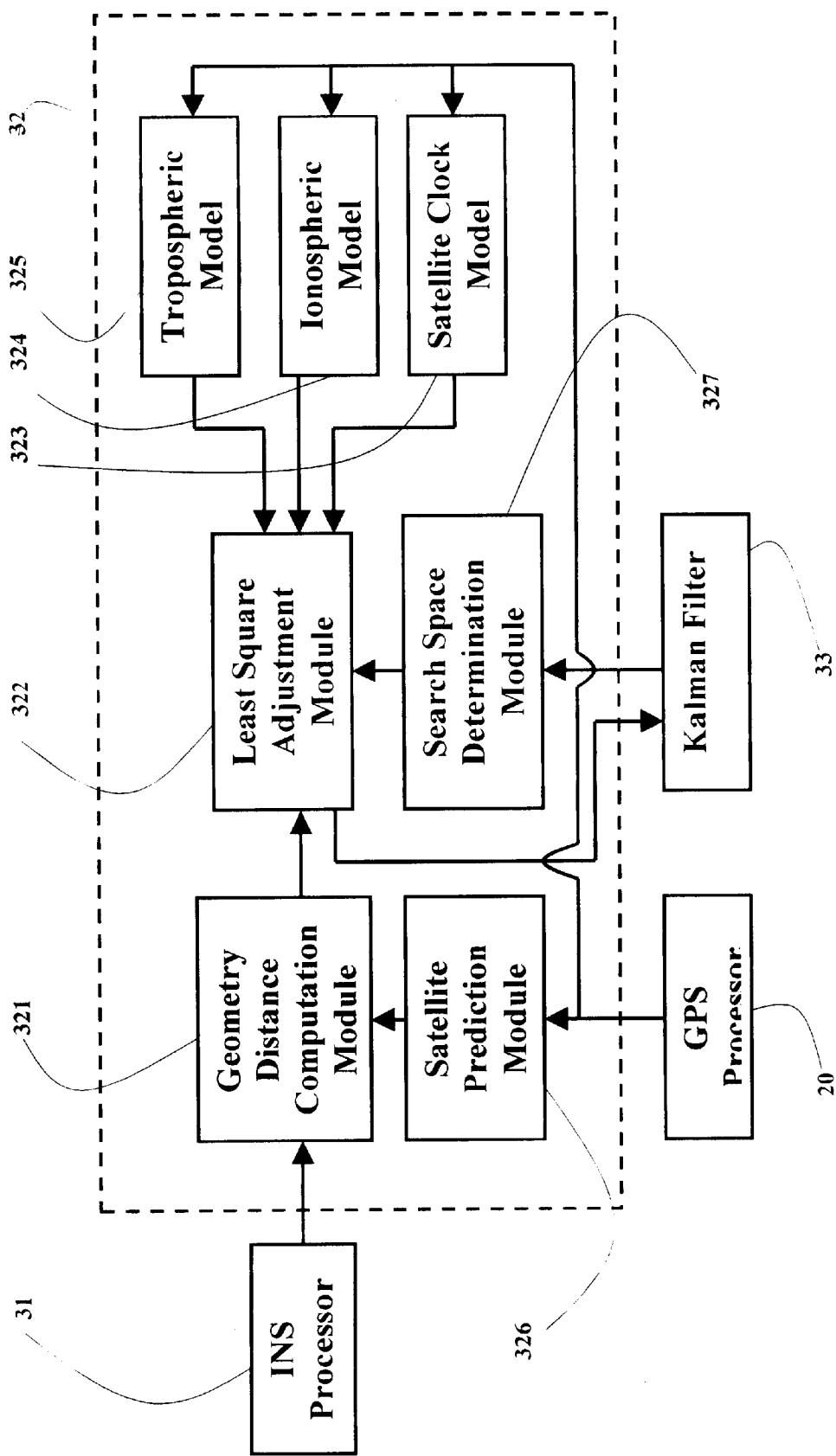
FIG. 8 is a block diagram of the global positioning system satellite signal carrier phase ambiguity resolution with aiding of inertial navigation system according to the above preferred embodiment of the present invention.

The IMU aiding global positioning system satellite signal carrier phase integer ambiguity resolution is given in FIG. 8 which consists of a geometry distance computation module 321, a least square adjustment module 322, a satellite clock model 323, an ionospheric model 324, a tropospheric model 325, a satellite prediction module 326, and a search space determination module 327.

A basic feature of global positioning system satellite signal carrier phase ambiguity is that there is no time dependency as long as tracking is maintained without interruption. The carrier phase measurement can be represented as:

$$\Phi = \frac{1}{\lambda}\rho + f\Delta\delta + N + \frac{d_{eph}}{\lambda} - \frac{d_{iono}}{\lambda} + \frac{d_{trop}}{\lambda} + \varepsilon$$

where, $\Phi$ is the measured carrier phase; $\lambda$ is the signal wavelength; $\rho$ is the true geometric distance between the receiver and satellite; f is the signal frequency; $\Delta\delta = \delta^N - \delta_R$ is the clock error; $\delta^N$ is the satellite clock bias; $\delta_R$ is the receiver error; N is the carrier phase integer ambiguity; $d_{eph}$ is the range error induced by ephemeris error; $d_{iono}$ is the propagation error induced by ionosphere $d_{nop}$ is the propagation error induced by troposphere; $\varepsilon$ is the phase noise.

When dual frequency is available (using an L1 and L2 dual frequency global positioning system receiver), the dual frequency carrier phase measurements can be used to cancel almost all of the ionospheric error which is the main error source for range measurement. Furthermore, the IMU aiding carrier phase ambiguity resolution is also applied to the wide-lane signal formed between the dual frequency carrier phase measurements. The wide-lane signal can be expressed as $$\Phi_w = \Phi_{L1} - \Phi_{L2}$$

where $\Phi_{L1}$ is the L1 channel carrier phase measurement; $\Phi_{L2}$ is the L2 channel carrier phase measurement. The corresponding wide-lane frequency and phase ambiguity are $$f_w + f_{L1} - f_{L2}, N_w = N_{L1} - N_{L2}.$$

The problem of fixing carrier phase ambiguity is further complicated by the need to re-determine the ambiguities every time when lock to satellite is lost (this phenomenon is called a cycle slip). The cycle slip must be detected and repaired to maintain high precision navigation solutions.

Three sources for cycle slips can be distinguished. First, cycle slips are caused by obstructions of the satellite signal due to trees, buildings, bridges, mountains, etc. This source is the most frequent one. The second source for cycle slips is a low signal-to-noise ratio (SNR) due to bad ionospheric conditions, multi-path, high receiver dynamics, or low satellite elevation. A third source is the receiver oscillator. In this present invention, the IMU aiding is also used for the cycle slip detection and repairing.

The satellite prediction module 326 collects the ephemeris of visible global positioning system satellites from the GPS processor 20 to perform satellite position calculation. The predicted satellite position is passed to the geometry distance computation module 321. The geometry distance computation module 321 receives the vehicle's precision position information from the INS processor 31. Based on the position information of the satellite and the vehicle, the geometrical distance between the satellite and the vehicle is computed by the geometry distance computation module 321 which is different from the pseudorange derived from the code tracking loop of the GPS processor 20. The resolved geometrical distance is sent to the least square adjustment module 322.

The tropospheric model 325 collects the time tag from the GPS processor 326 and calculates the tropospheric delay of the global positioning system satellite signal using the embedded tropospheric delay model. The calculated tropospheric delay is sent to the least square adjustment module 322.

The ionospheric model 324 collects the time tag and the ionospheric parameters broadcast by the global positioning system satellite from the GPS processor 20. Using these ionospheric data and the embedded ionospheric delay model, the ionospheric model 324 calculates the minus time delay introduced by the ionosphere. The calculated ionospheric delay is sent to the least square adjustment module 322.

The satellite clock model 323 collects the global positioning system satellite clock parameters to perform the satellite clock correction calculation. The satellite clock correction is also sent to the least square adjustment module 322.

The search space determination module 327 receives the covariance matrix of the measurement vector from the Kalman filter 33. Based on the covariance matrix, the search space determination module 327 derives the measurement error and determine the global positioning system satellite carrier phase integer ambiguity search space. The carrier phase ambiguity search space is sent to the least square adjustment module 322.

The least square adjustment module 322 gathers the geometrical distance from the vehicle to the global positioning system satellite from the geometry distance computation module 321, the tropospheric delay, from the tropospheric model 325, the ionospheric delay from the ionospheric model 324, and the satellite clock correction from the satellite clock model 323 to calculate the initial search origin. The least square adjustment module 322 also receives the search space from the search space determination module 327. A standard least square adjustment algorithm applied to the initial search origin and the search space to fix the carrier phase ambiguity.

By means of the positioning and navigation system disclosed above, a basic positioning and navigation method can be substantially achieved by integrating an IMU 10 and a Magnetometer 50 with a central navigation processor 30 which may merely comprises an AHRS processor 34 and an INS processor 31, wherein the method comprises the steps of:

(a) receiving a plurality of inertial measurements including body angular rates and specific forces from the IMU 10;

(b) sending the inertial measurements from the IMU 10 to the inertial navigation system (INS) processor 31 of the central navigation processor 30 for computing an inertial navigation solution which are position, velocity, acceleration, and attitude of the carrier;

(c) receiving an Earth magnetic field measurement from the magnetometer 50;

(d) sending the Earth magnetic field measurement from the magnetometer 50 to the AHRS (Attitude and Heading Reference System) processor 34 of the central navigation processor 30; and (e) sending said inertial measurements from said IMU 10 to the AHRS processor 34 of the central navigation processor 30 to blend with the Earth magnetic field measurement for computing an AHRS solution which are attitude and heading data of the carrier.

After the step (e), the positioning and navigation method further comprises a step (f) of sending the inertial navigation solution from the INS processor 31 and the AHRS solution from the AHRS processor 34 to the I/O interface 40, so as to provide navigation data and attitude and heading data for an on-board system of the carrier.

When the GPS processor 20 is integrated, the positioning and navigation method of present invention comprises the steps of:

(a) receiving a plurality of global positioning system satellite signals to derive position and velocity information and a plurality of global positioning system (GPS) raw measurements, including pseudorange, carrier phase, and Doppler shift, of a carrier:

(b) sending the GPS raw measurements to the central navigation processor 30 from the GPS processor 20;

(c) receiving a plurality of inertial measurements including body angular rates and specific forces from the IMU 10;

(d) sending the inertial measurements from the IMU 10 to the inertial navigation system (INS) processor 31 of the central navigation processor 30 for computing an inertial navigation solution, which are position, velocity, acceleration, and attitude of the carrier;

(e) receiving an Earth magnetic field measurement from the magnetometer 50;

(f) sending the Earth magnetic field measurement from the magnetometer 50 to the AHRS (Attitude and Heading Reference System) processor 34 of the central navigation processor 30;

(g) sending the inertial measurements, including the body angular rates and the specific forces, from the IMU 10 to the AHRS processor 34 to blend with the Earth magnetic field measurement for computing an AHRS solution which are attitude and heading data of the carrier;

(h) blending an inertial navigation solution derived from the INS processor 31 and the GPS raw measurements from the GPS processor 20 in the Kalman filter or robust Kalman filter 33 to derive a plurality of INS corrections and GPS corrections, and (i) feeding back the INS corrections from the robust Kalman filter 33 to the INS processor 31 to correct the inertial navigation solution.

After the step (i), the positioning and navigation method further comprises a step of outputting the AHRS solution as navigation data through an I/O interface 40 when the GPS satellite signals are not available.

After the step (i), the positioning and navigation method further comprises the steps of:

(j) injecting the GPS raw measurements from the GPS processor 20, the inertial navigation solution from the INS processor 31, and the inertial corrections and the GPS correction from the Kalman filter (or robust Kalman filter) into a carrier phase integer ambiguity resolution module to fix a plurality of GPS satellite signal carrier phase integer ambiguity numbers; and (k) sending the GPS satellite signal carrier phase integer numbers from the carrier phase integer ambiguity resolution module to the Kalman filter (or robust Kalman filter) to derive a further improved navigation solution.

In view of above, the present invention can provides a positioning and navigation method and system thereof to substantially solve the problems encountered in global positioning system-only, inertial navigation system-only and even GPS/IMU integrated system, such as loss of global positioning satellite signal, sensibility to jamming and spoofing, and inertial solution's drift over time. The following features and advantages can thus be achieved:

(1) When the GPS signals are not available, such as the vehicle or the carrier of the positioning system is inside an enclosed structure, e.g. a parking structure, no attitude and heading solution can be obtained.

(2) The velocity and acceleration from an inertial navigation processor are used to aid the code and carrier phase tracking of the global positioning system satellite signals, so as to enhance the performance of the global positioning and inertial integration system, even in heavy jamming and high dynamic environments.

(3) The velocity and acceleration from an inertial navigation processor are corrected by a Kalman filter and used to aid the code and carrier phase tracking of the global positioning system satellite signals, so as to enhance the performance of the global positioning and inertial integration system, even in heavy jamming and high dynamic environments.

(4) The velocity and acceleration from an inertial navigation processor are used to aid the code and carrier phase tracking of the global positioning system satellite signals to prevent loss of satellite signal and carrier phase clips encountered in a global positioning system receiver.

(5) The velocity and acceleration from an inertial navigation processor corrected by a Kalman filter are used to aid the code and carrier phase tracking of the global positioning system satellite signals to prevent loss of satellite signal and carrier phase clips encountered in a global positioning system receiver.

(6) The inertial navigation system aids the satellite signal integer ambiguity resolution of the global positioning system by providing more accurate position information.

(7) The integrated navigation solution of global positioning system and inertial measurement unit aids the satellite signal integer ambiguity resolution of the global positioning system by providing more accurate position information and error covariance matrix.

(8) The satellite signal carrier phase measurements are used in the Kalman filter, as well as the pseudorange and delta range of the global positioning system, so as to improve the accuracy of integration positioning solution.

(9) The Kalman filter is implemented in real time to optimally blend the global positioning system raw data and the inertial navigation solution, and to estimate the navigation solution.

(10) The robust Kalman filter is implemented in real time to eliminate the possible instability of the integration solution.

(11) Low accurate inertial sensor is used for achieving a high accurate integration solution due to the aiding of global positioning system measurement.

What is claimed is:

1. A positioning and navigation system, comprising:

an IMU (Inertial Measurement Unit) providing inertial measurements including body angular rates and specific forces;

a GPS (Global Positioning System) processor receiving GPS satellite signals to derive position and velocity information and GPS raw measurements including pseudorange, carrier phase, and Doppler shift;

a magnetometer generating an Earth magnetic field measurement; and a central navigation processor which comprises:

an INS (Inertial Navigation System) processor receiving said inertial measurements, including said body angular rates and said specific forces, for computing an inertial navigation solution which are position, velocity, acceleration, and attitude of a carrier carrying said positioning and navigation system;

a Kalman filter receiving said GPS raw measurements and said inertial navigation solution derived from said INS processor which is blended with said GPS raw measurements to derive a plurality of INS corrections and GPS corrections, wherein said INS corrections are fed back from said Kalman filter to said INS processor to correct said inertial navigation solution; and an AHRS (Attitude and Heading Reference System) processor receiving said Earth magnetic field measurement from said magnetometer and said inertial measurements from said IMU which is blended with said Earth magnetic field measurement for computing an AHRS solution which are attitude and heading data of said carrier and being outputted as navigation solution when said GPS satellite signals are not available.

2. The system, as recited in claim 1, further comprising an I/O interface which receives said navigation solution from said INS processor to provide navigation data for an on-board system.

3. The system, as recited in claim 1, wherein said AHRS processor comprises an angular increment and velocity increment processing module which receives said body angular rates and specific forces from said IMU to produce three-axis angular increment values and three-axis velocity increment values.

4. The system, as recited in claim 3, wherein said three-axis angular increment values from said angular increment and velocity increment processing module and coarse angular rate bias obtained from an IMU calibration procedure at a high data rate in short interval are connected to a coning correction module for computing coning effect errors in said coning correction module using said three-axis angular increment values and coarse angular rate bias and outputting three-axis coning effect terms and three-axis angular increment values at reduced data rate in long interval, which are called three-axis long-interval angular increment values, into an angular rate compensation module.

5. The system, as recited in claim 4, wherein said coning effect errors and three-axis long-interval angular increment values from said coning correction module and angular rate device misalignment parameters and fine angular rate bias from said IMU calibration procedure are connected to said angular rate compensation module for compensating definite errors in said three-axis long-interval angular increment values using said coning effect errors, angular rate device misalignment parameters, fine angular rate bias, and coning correction scale factor, and outputting said real three-axis angular increments to an alignment rotation vector computation module.

6. The system, as recited in claim 5, wherein said three-axis velocity increment values from said angular increment and velocity increment processing module and acceleration device misalignment, and acceleration device bias from said IMU calibration procedure are connected into an accelerometer compensation module for compensating said definite errors in three-axis velocity increments using said acceleration device misalignment, and accelerometer bias; outputting said compensated three-axis velocity increments to a level acceleration computation module.

7. The system, as recited in claim 6, wherein by using said compensated three-axis angular increments from said angular rate compensation module, an east damping rate increment from an east damping rate computation module, a north damping rate increment from a north damping rate computation module, and vertical damping rate increment from a vertical damping rate computation module, a quaternion, which is a vector representing rotation angle of said carrier, is updated, and said updated quaternion is connected to a direction cosine matrix computation module for computing said direction cosine matrix, by using said updated quaternion.

8. The system, as recited in claim 7, wherein said computed direction cosine matrix is connected to said level acceleration computation module and an attitude and heading angle extract module for extracting attitude and heading angle as said AHRS solution, using said direction cosine matrix from said direction cosine matrix computation module.

9. The system, as recited in claim 8, wherein said compensated three-axis velocity increments are connected to said level acceleration computation module for computing level velocity increments using said compensated three-axis velocity increments from said acceleration compensation module and said direction cosine matrix from said direction cosine matrix computation module.

10. The system, as recited in claim 9, wherein said level velocity increments are connected to said east damping rate computation module for computing east damping rate increments using said north velocity increment of said input level velocity increments from said level acceleration computation module.

11. The system, as recited in claim 10, wherein said level velocity increments are connected to said north damping rate computation module for computing north damping rate increments using said east velocity increment of said level velocity increments from said level acceleration computation module.

12. The system, as recited in claim 11, wherein said earth magnetic field measurements in three axes from said magnetometer and attitude data from said attitude and heading angle extract module are connected to a magnetic heading computation module to produce a measured magnetic heading angle.

13. The system, as recited in claim 12, wherein said heading angle from said attitude and heading angle extract module and said measured magnetic heading angle from said magnetic heading computation module are connected to said vertical damping rate computation module for computing vertical damping rate increments.

14. The system, as recited in claim 13, wherein said east damping rate increments, north damping rate increments, and vertical damping rate are fed back to said alignment rotation vector computation module to damp said drift of errors of said attitude and heading angles.

15. The system, as recited in claim 2, wherein said AHRS processor comprises an angular increment and velocity increment processing module which receives said body angular rates and specific forces from said IMU to produce three-axis angular increment values and three-axis velocity increment values; wherein said three-axis angular increment values from said angular increment and velocity increment processing module and coarse angular rate bias obtained from an IMU calibration procedure at a high data rate in short interval are connected to a coning correction module for computing coning effect errors in said coning correction module using said three-axis angular increment values and coarse angular rate bias and outputting three-axis coning effect terms and three-axis angular increment values at reduced data rate in long interval, which are called three-axis long-interval angular increment values, into an angular rate compensation module; wherein said coning effect errors and three-axis long-interval angular increment values from said coning correction module and angular rate device misalignment parameters and fine angular rate bias from said IMU calibration procedure are connected to said angular rate compensation module for compensating definite errors in said three-axis long-interval angular increment values using said coning effect errors, angular rate device misalignment parameters, fine angular rate bias, and coning correction scale factor, and outputting said real three-axis angular increments to an alignment rotation vector computation module; wherein said three-axis velocity increment values from said angular increment and velocity increment processing module and acceleration device misalignment, and acceleration device bias from said IMU calibration procedure are connected into an accelerometer compensation module for compensating said definite errors in three-axis velocity increments using said acceleration device misalignment, and accelerometer bias; outputting said compensated three-axis velocity increments to a level acceleration computation module; wherein by using said compensated three-axis angular increments from said angular rate compensation module, an east damping rate increment from an east damping rate computation module, a north damping rate increment from a north damping rate computation module, and vertical damping rate increment from a vertical damping rate computation module, a quaternion, which is a vector representing rotation angle of said carrier, is updated, and said updated quaternion is connected to a direction cosine matrix computation module for computing said direction cosine matrix, by using said updated quaternion; wherein said computed direction cosine matrix is connected to said level acceleration computation module and an attitude and heading angle extract module for extracting attitude and heading angle as said AHRS solution, using said direction cosine matrix from said direction cosine matrix computation module; wherein said compensated three-axis velocity increments are connected to said level acceleration computation module for computing level velocity increments using said compensated three-axis velocity increments from said acceleration compensation module and said direction cosine matrix from said direction cosine matrix computation module; wherein said level velocity increments are connected to said east damping rate computation module for computing east damping rate increments using said north velocity increment of said input level velocity increments from said level acceleration computation module; wherein said level velocity increments are connected to said north damping rate computation module for computing north damping rate increments using said east velocity increment of said level velocity increments from said level acceleration computation module; wherein said earth magnetic field measurements in three axes from said magnetometer and attitude data from said attitude and heading angle extract module are connected to a magnetic heading computation module to produce a measured magnetic heading angle; wherein said heading angle from said attitude and heading angle extract module and said measured magnetic heading angle from said magnetic heading computation module are connected to said vertical damping rate computation module for computing vertical damping rate increments; wherein said east damping rate increments, north damping rate increments, and vertical damping rate are fed back to said alignment rotation vector computation module to damp said drift of errors of said attitude and heading angles.

16. The system, as recited in claim 2 or 15, wherein said central navigation processor further comprises a carrier phase integer ambiguity resolution module, wherein said INS processor provides velocity and acceleration data injecting into a micro-processor of said GPS processor to aid code and carrier phase tracking of GPS satellite signals, wherein an output of said micro-processor of said GPS processor, an output of said INS processor and an output of said Kalman filter are injected into said carrier phase integer ambiguity resolution module to fix global positioning system satellite signal carrier phase integer ambiguity number, wherein said carrier phase integer ambiguity resolution module outputs carrier phase integer number into said Kalman filter to further improve positioning accuracy.

17. The system, as recited in claim 16, wherein said microprocessor of said GPS processor outputs said pseudorange, said Doppler shifts, global positioning system satellite ephemeris, and atmosphere parameters to said Kalman filter.

18. The system, as recited in claim 17, wherein said INS processor processes said inertial measurements, which are said body angular rates and said specific forces, and said position error, velocity error, and attitude error coming from said Kalman filter to derive said corrected navigation solution.

19. The system, as recited in claim 18, wherein said INS processor comprises an IMU I/O interface, an IMU error compensation module, a coordinate transformation computation module, an attitude position velocity computation module, a transformation matrix computation module, and an earth and vehicle rate computation module, wherein said IMU I/O interface collects said signal of said body angular rates and specific forces from said IMU for processing and converting to digital data which are corrupted by said inertial sensor measurement errors to form contaminated data that are passed to said IMU error compensation module, wherein said IMU error compensation module receives sensor error estimates derived from said Kalman filter to perform IMU error mitigation on said IMU data, said corrected inertial data being sent to said coordinate transformation computation module and said transformation matrix computation module, where said body angular rates are sent to said transformation matrix computation module and said specific forces are sent said coordinate transformation computation module, wherein said transformation matrix computation module receives said body angular rates from said IMU error computation module and an earth and vehicle rate from said earth and vehicle rate computation module to perform transformation matrix computation, said transformation matrix computation module sending said transformation matrix to said coordinate transformation computation module and attitude position velocity computation module, an attitude update algorithm in said transformation matrix computation module using said quaternion method because of its advantageous numerical and stability characteristics, wherein said coordinate transformation module collects said specific forces from said IMU error computation module and said transformation matrix from said transformation matrix computation module to perform said coordinate transformation, said coordinate transformation computation sending said specific forces transferred into said coordinate system presented by said transformation matrix to said attitude position velocity computation module, wherein said attitude position velocity computation module receives said transformed specific forces from said coordinate transformation computation module and said transformation matrix from said transformation matrix computation module to perform said attitude, position, velocity update.

20. The system, as recited in claim 19, wherein after computation of said position and velocity, said position and velocity errors calculated by said Kalman filter are used in said attitude position velocity computation module to correct said inertial solution.

21. The system, as recited in claim 20, wherein said attitude errors computed by said Kalman filter is sent to said attitude position velocity computation module to perform attitude correction in said attitude position velocity computation module.

22. The system, as recited in claim 20, wherein said attitude errors computed by said Kalman filter is sent to said transformation matrix computation module to perform said attitude correction before said attitude position velocity computation module.

23. The system, as recited in claim 20, wherein the corrected inertial solution obtained from said attitude position velocity computation module is passed to said Kalman filter to construct said measurements of said Kalman filter, moreover the corrected inertial navigation solution is also sent to said carrier phase integer ambiguity resolution module to aid said global positioning system satellite carrier phase integer ambiguity fixing, and that the corrected velocity and accelerate is passed to microprocessor of said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information is send to said I/O interface which provides a navigation data source for avionics systems onboard a vehicle.

24. The system, as recited in claim 21, wherein the corrected inertial solution obtained from said attitude position velocity computation module is passed to said Kalman filter to construct said measurements of said Kalman filter, moreover the corrected inertial navigation solution is also send to said carrier phase integer ambiguity resolution module to aid said global positioning system satellite carrier phase integer ambiguity fixing, and that the corrected velocity and accelerate is passed to microprocessor of said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information is sent to said I/O interface which provides a navigation data source for avionics systems onboard a vehicle.

25. The system, as recited in claim 22, wherein the corrected inertial solution obtained from said attitude position velocity computation module is passed to said Kalman filter to construct said measurements of said Kalman filter, moreover the corrected inertial navigation solution is also sent to said carrier phase integer ambiguity resolution module to aid said global positioning system satellite carrier phase integer ambiguity fixing, and that the corrected velocity and accelerate is passed to microprocessor of said GPS processor to aid said global positioning system satellite signal carrier phase and code tracking, wherein attitude, position, and velocity computed by said attitude position velocity computation module are sent to said earth and vehicle rate computation module to calculate an Earth rotation rate and a vehicle rotation rate which are sent to said transformation matrix computation module, wherein said attitude, position, and velocity information is sent to said I/O interface which provides a navigation data source for avionics systems onboard a vehicle.

26. The system, as recited in claim 25, wherein said Kalman filter is a robust Kalman filter for providing near-optimal performance over a large class of process and measurement models and for blending said GPS measurements and said inertial sensor measurements.

27. The system, as recited in claim 26, wherein said robust Kalman filter comprises a GPS error compensation module for gathering said pseudorange, carrier phase, and Doppler frequency of said GPS measurements from said GPS processor, and said position and velocity corrections from an updating state vector module to perform GPS error compensation to form corrected GPS raw data, including pseudorange, carrier phase, and Doppler frequency, which are sent to a preprocessing module, wherein said preprocessing module receives GPS satellite ephemeris from said GPS processor said corrected GPS raw data from said GPS error compensation module, and INS solutions from said INS processor, said preprocessing module performing calculation of state transit matrix and sending with said state vector to a state vector prediction module, wherein said calculated state transit matrix is also sent to a covariance propagation module which calculates a measurement matrix and a current measurement vector according to a computed measurement matrix and a measurement model, and that said measurement matrix and said computed current measurement vector are passed to a computing measurement residue module, said state vector prediction module receiving said state transit matrix and said state vector from said preprocessing module to perform state prediction of current epoch, said predicted current state vector being passed to said computing measurement residue module which receives predicted current state vector from said state vector prediction module and said measurement matrix and said current measurement vector from said preprocessing module, wherein said computing measurement residue module calculates measurement residues by subtracting said multiplication of said measurement matrix and said predicted current state vector from said current measurement vector, and said measurement residues are sent to a residue monitor module and said updating state vector module, wherein said residue monitor module performs a discrimination on said measurement residues received from said computing measurement residue module, wherein said covariance propagation module gathers covariance of system process from said residue monitor module, said state transit matrix from said preprocessing module, and covariance of estimated error to calculate current covariance of said estimated error which is sent to a computing optimal gain module, wherein said computing optimal gain module receives said current covariance of said estimated error from said covariance computing module to compute optimal gain which is passed to a covariance updating module and said updating state vector module, said covariance updating module updating said covariance of said estimated error and sending to said covariance propagation module, wherein said updating state vector module receives said optimal gain from said computing optimal gain module and said measurement residues from said computing measurement residue module, said updating state vector calculating said current estimate of state vector including position, velocity and attitude errors and sending to said GPS error compensation module and said INS processor.

28. The system, as recited in claim 25, wherein said carrier phase integer ambiguity resolution module collects position and velocity data from said INS processor, said carrier phase and Doppler shift measurement from said microprocessor of said GPS processor, and covariance matrix from said Kalman filter to fix said global positioning system satellite signal integer ambiguity number, wherein after fixing of carrier phase ambiguities, said carrier phase ambiguity number is passed to said Kalman filter to further improve said measurement accuracy of said global positioning system raw data.

29. The system, as recited in claim 28, wherein said carrier phase integer ambiguity resolution module comprises a geometry distance computation module, a least square adjustment module, a satellite clock model, an ionospheric model, a tropospheric model, a satellite prediction module, and a search space determination module, wherein said satellite prediction module collects ephemeris of visible global positioning system satellites from said GPS processor to perform satellite position calculation, a predicted satellite position is passed to said geometry distance computation module which receives a vehicle's precision position information from said INS processor and computes a geometrical distance between a satellite and a vehicle that is sent to said least square adjustment module, wherein said tropospheric model collects a time tag from said GPS processor and calculates a tropospheric delay of said global positioning system satellite signal using said embedded tropospheric delay model, in which said calculated troposheric delay is sent to said least square adjustment module, besides said ionospheric model collects said time tag and ionospheric parameters broadcast by said global positioning system satellite from said GPS processor, so that said ionospheric model calculates a minus time delay introduced by said ionosphere that is sent to said least square adjustment module, moreover said satellite clock model collects global positioning system satellite clock parameters to perform satellite clock correction calculation, in which said satellite clock correction is also sent to said least square adjustment module, and that said search space determination module receives covariance matrix of said measurement vector from said Kalman filter, so that based on said covariance matrix, said search space determination module derives said measurement error and determines said global positioning system satellite carrier phase integer ambiguity search space which is sent to said least square adjustment module, wherein said least square adjustment module gathers said geometrical distance from said vehicle to said global positioning system satellite from said geometry distance computation module, said tropospheric delay from said tropospheric model, said ionospheric delay from said ionospheric model, and said satellite clock correction from said satellite clock model to calculate an initial search origin, said least square adjustment module also receiving a search space from said search space determination module wherein a standard least square adjustment algorithm is applied to said initial search origin and said search space to fix said carrier phase ambiguity.

30. A positioning and navigation method, comprising the steps of:

(a) receiving a plurality of global positioning system satellite signals to derive position and velocity information and a plurality of global positioning system (GPS) raw measurements, including pseudorange, carrier phase, and Doppler shift, of a carrier;

(b) sending said GPS raw measurements to a central navigation processor from a GPS (Global Positioning System) processor;

(c) receiving a plurality of inertial measurements including body angular rates and specific forces from a IMU (Inertial Measurement Unit);

(d) seeding said inertial measurements from said IMU to an INS (Inertial Navigation System) processor of said central navigation processor for computing an inertial navigation solution, which are position, velocity, acceleration, and attitude of said carrier;

(e) receiving an Earth magnetic field measurement from a magnetometer;

(f) sending said Earth magnetic field measurement from said magnetometer to an AHRS (Attitude and Heading Reference System) processor of said central navigation processor;

(g) sending said inertial measurements, including said body angular rates and said specific forces, from said IMU to said AHRS processor to blend with said Earth magnetic field measurement for computing an AHRS solution which are attitude and heading data of said carrier;

(h) blending an inertial navigation solution derived from said INS processor and said GPS raw measurements from said GPS processor in a Kalman filter to derive a plurality of INS corrections and GPS corrections; and (i) feeding back said INS corrections from said Kalman filter to said INS processor to correct said inertial navigation solution.

31. The method, as recited in claim 30 after the step (i), further comprising a step of:

(j) outputting said AHRS solution as navigation data through an I/O interface when said GPS satellite signals are not available.

32. The method, as recited in claim 30, after the step (i), further comprising the steps of:

injecting said GPS raw measurements from said GPS processor, said inertial navigation solution from said INS processor, and said inertial corrections and said GPS corrections from said Kalman filter into a carrier phase integer ambiguity resolution module to fix a plurality of GPS satellite signal carrier phase integer ambiguity numbers; and sending said GPS satellite signal carrier phase integer numbers from said carrier phase integer ambiguity resolution module to said Kalman filter to derive a further improved navigation solution.

33. The method, as recited in claim 31, after the step (j) further comprising the steps of:

injecting said GPS raw measurements from said GPS processor, said inertial navigation solution from said INS processor, and said inertial corrections and said GPS corrections from said Kalman filter into a carrier phase integer ambiguity resolution module to fix a plurality of GPS satellite signal carrier phase integer ambiguity numbers; and sending said GPS satellite signal carrier phase integer numbers from said carrier phase integer ambiguity resolution module to said Kalman filter to derive a further improved navigation solution.

34. The method, as recited in claim 30, 31, 32, or 33, wherein said Kalman filter is a robust Kalman filter.

35. The method, as recited in claim 31, wherein said AHRS processor comprises an angular increment and velocity increment processing module which receives said body angular rates and specific forces from said IMU to produce three-axis angular increment values and three-axis velocity increment values; wherein said three-axis angular increment values from said angular increment and velocity increment processing module and coarse angular rate bias obtained from an IMU calibration procedure at a high data rate in short interval are connected to a coning correction module for computing coning effect errors in said coning correction module using said three-axis angular increment values and coarse angular rate bias and outputting three-axis coning effect terms and three-axis angular increment values at reduced data rate in long interval, which are called three-axis long-interval angular increment values, into an angular rate compensation module; wherein said coning effect errors and three-axis long-interval angular increment values from said coning correction module and angular rate device misalignment parameters and fine angular rate bias from said IMU calibration procedure are connected to said angular rate compensation module for compensating definite errors in said three-axis long-interval angular increment values using said coning effect errors, angular rate device misalignment parameters, fine angular rate bias, and coning correction scale factor, and outputting said real three-axis angular increments to an alignment rotation vector computation module; wherein paid three-axis velocity increment values from said angular increment and velocity increment processing module and acceleration device misalignment, and acceleration device bias from said IMU calibration procedure are connected into an accelerometer compensation module for compensating said definite errors in three-axis velocity increments using said acceleration device misalignment, and accelerometer bias; outputting said compensated three-axis velocity increments to a level acceleration computation module; wherein by using said compensated three-axis angular increments from said angular rate compensation module, an east damping rate increment from an east damping rate computation module, a north damping rate increment from a north damping rate computation module, and vertical damping rate increment from a vertical damping rate computation module, a quaternion, which is a vector representing rotation angle of said carrier, is updated, and said updated quaternion is connected to a direction cosine matrix computation module for computing said direction cosine matrix, by using said updated quaternion; wherein said computed direction cosine matrix is connected to said level acceleration computation module and an attitude and heading angle extract module for extracting attitude and heading angle as said AHRS solution, using said direction cosine matrix from said direction cosine matrix computation module; wherein said compensated three-axis velocity increments are connected to said level acceleration computation module for computing level velocity increments using said compensated three-axis velocity increments from said acceleration compensation module and said direction cosine matrix from said direction cosine matrix computation module; wherein said level velocity increments are connected to said east damping rate computation module for computing east damping rate increments using said north velocity increment of said input level velocity increments from said level acceleration computation module; wherein said level velocity increments are connected to said north damping rate computation module for computing north damping rate increments using said east velocity increment of said level velocity increments from said level acceleration computation module; wherein said earth magnetic field measurements in three axes from said magnetometer and attitude data from said attitude and heading angle extract module are connected to a magnetic heading computation module to produce a measured magnetic heading angle; wherein said heading angle from said attitude and heading angle extract module and said measured magnetic heading angle from said magnetic heading computation module are connected to said vertical damping rate computation module for computing vertical damping rate increments; wherein said east damping rate increments, north damping rate increments, and vertical damping rate are fed back to said alignment rotation vector computation module to damp said drift of errors of said attitude and heading angles.

36. A positioning and navigation method, comprising the steps of:
   (a) receiving a plurality of inertial measurements including body angular rates and specific forces from an IMU (Inertial Measurement Unit);
   (b) sending said inertial measurements from said IMU to an INS (Inertial Navigation System) processor of a central navigation processor for computing an inertial navigation solution, which are position, velocity, acceleration, and attitude of a carrier;
   (c) receiving an Earth magnetic field measurement from a magnetometer;
   (d) sending said Earth magnetic field measurement from said magnetometer to an AHRS (Attitude and Heading Reference System) processor of said central navigation processor;
   (e) sending said inertial measurements from said IMU to said AHRS processor of said central navigation processor to blend with said Earth magnetic field measurement for computing an AHRS solution which are attitude and heading data of said carrier;
   (f) sending said inertial navigation solution from said INS processor and said AHRS solution from said AHRS processor to an I/O interface, so as to provide navigation data and attitude and heading data for said carrier;
   wherein said AHRS processor comprises an angular increment and velocity increment processing module which receives said body angular rates and specific forces from said IMU to produce three-axis angular increment values and three-axis velocity increment values; wherein said three-axis angular increment values from said angular increment and velocity increment processing module and coarse angular rate bias obtained from an IMU calibration procedure at a high data rate in short interval are connected to a coning correction module for computing coning effect errors in said coning correction module using said three-axis angular increment values and coarse angular rate bias and outputting three-axis coning effect terms and three-axis angular increment values at reduced data rate in long interval, which are called three-axis long-interval angular increment values, into an angular rate compensation module; wherein said coning effect errors and three-axis long-interval angular increment values from said coning correction module and angular rate device misalignment parameters and fine angular rate bias from said IMU calibration procedure are connected to said angular rate compensation module for compensating definite errors in said three-axis long-interval angular increment values using said coning effect errors, angular rate device misalignment parameters, fine angular rate bias, and coning correction scale factor, and outputting said real three-axis angular increments to an alignment rotation vector computation module; wherein said three-axis velocity increment values from said angular increment and velocity increment processing module and acceleration device misalignment, and acceleration device bias from said IMU calibration procedure are connected into an accelerometer compensation module for compensating said definite errors in three-axis velocity increments using said acceleration device misalignment, and accelerometer bias; outputting said compensated three-axis velocity increments to a level acceleration computation module; wherein by using said compensated three-axis angular increments from said angular rate compensation module, an east damping rate increment from an east damping rate computation module, a north damping rate increment from a north damping rate computation module, and vertical damping rate increment from a vertical damping rate computation module, a quaternion, which is a vector representing rotation angle of said carrier, is updated, and said updated quaternion is connected to a direction cosine matrix computation module for computing said direction cosine matrix, by using said updated quaternion; wherein said computed direction cosine matrix is connected to said level acceleration computation module and an attitude and heading angle extract module for extracting attitude and heading angle as said AHRS solution, using said direction cosine matrix from said direction cosine matrix computation module; wherein said compensated three-axis velocity increments are connected to said level acceleration computation module for computing level velocity increments using said compensated three-axis velocity increments from said acceleration compensation module and said direction cosine matrix from said direction cosine matrix computation module; wherein said level velocity increments are connected to said east damping rate computation module for computing east damping rate increments using said north velocity increment of said input level velocity increments from said level acceleration computation module; wherein said level velocity increments are connected to said north damping rate computation module for computing north damping rate increments using said east velocity increment of said level velocity increments from said level acceleration computation module; wherein said earth magnetic field measurements in three axes from said magnetometer and attitude data from said attitude and heading angle extract module are connected to a magnetic heading computation module to produce a measured magnetic heading angle; wherein said heading angle from said attitude and heading angle extract module and said measured magnetic heading angle from said magnetic heading computation module are connected to said vertical damping rate computation module for computing vertical damping rate increments; wherein said east damping rate increments, north damping rate increments, and vertical damping rate are fed back to said alignment rotation vector computation module to damp said drift of errors of said attitude and heading angles.

* * * * *